United States Patent
Moon

(10) Patent No.: US 11,582,241 B1
(45) Date of Patent: Feb. 14, 2023

(54) COMMUNITY SERVER FOR SECURE HOSTING OF COMMUNITY FORUMS VIA NETWORK OPERATING SYSTEM IN SECURE DATA NETWORK

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 19 days.

(21) Appl. No.: 17/382,709

(22) Filed: Jul. 22, 2021

(51) Int. Cl.
- *G06F 7/04* (2006.01)
- *H04L 9/40* (2022.01)
- *G06F 9/54* (2006.01)

(52) U.S. Cl.
CPC ............ *H04L 63/102* (2013.01); *G06F 9/547* (2013.01); *H04L 63/0428* (2013.01)

(58) Field of Classification Search
CPC .... H04L 63/102; H04L 63/0428; G06F 9/547
USPC .......................................................... 726/4
See application file for complete search history.

(56) References Cited

U.S. PATENT DOCUMENTS

| | | | |
|---|---|---|---|
| 7,792,989 B2 | 9/2010 | Toebes et al. | |
| 7,818,607 B2 | 10/2010 | Turner et al. | |
| 8,954,595 B2 * | 2/2015 | Sundarrajan | H04L 47/10 709/217 |
| 9,477,524 B2 * | 10/2016 | Kang | G06F 9/4881 |
| 10,367,811 B2 * | 7/2019 | Clark | H04W 4/70 |
| 10,374,803 B2 * | 8/2019 | Clark | H04L 45/745 |
| 10,397,186 B2 * | 8/2019 | Clark | H04L 63/0272 |
| 10,630,642 B2 * | 4/2020 | Clark | G06F 21/606 |
| 11,140,136 B1 * | 10/2021 | Li | H04L 63/0414 |
| 2020/0126074 A1 * | 4/2020 | Koeppel | G06Q 20/327 |
| 2020/0252411 A1 * | 8/2020 | Inforzato | H04L 63/1425 |
| 2021/0026535 A1 | 1/2021 | Moon | |
| 2021/0026976 A1 | 1/2021 | Moon | |

(Continued)

OTHER PUBLICATIONS

Society video, "Society Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

(Continued)

*Primary Examiner* — Amare F Tabor
(74) *Attorney, Agent, or Firm* — Leon R. Turkevich

(57) ABSTRACT

In one embodiment, a method comprises: receiving, by a secure executable container executed by a network device, a request initiated by a user for a community forum in a secure data network, the user having generated the request via an endpoint device and the user having established a two-way trusted relationship with the endpoint device in the secure data network; processing, by the secure executable container, the request for the community forum in the secure data network, the processing including causing a network device executing a community server to post the community forum in the secure data network according to identifiable features selected by the user; and preventing, by the secure executable container, any executable resource in the network device from accessing the secure data network without authorized access via a prescribed Application Programming Interface (API) required by the secure executable container.

20 Claims, 11 Drawing Sheets

(56) References Cited

U.S. PATENT DOCUMENTS

| | | |
|---|---|---|
| 2021/0028940 A1 | 1/2021 | Moon |
| 2021/0028943 A1 | 1/2021 | Moon |
| 2021/0029092 A1 | 1/2021 | Moon |
| 2021/0029125 A1 | 1/2021 | Moon |
| 2021/0029126 A1 | 1/2021 | Moon |
| 2021/0081524 A1 | 3/2021 | Moon |
| 2021/0266346 A1* | 8/2021 | Gordon ................. H04L 63/166 |
| 2022/0123941 A1* | 4/2022 | Steinberg ............ H04L 63/1441 |

OTHER PUBLICATIONS

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "Society Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jlVTcQmADw>, 5 pages.

Society video, "Society Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "Society Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

"4-Way Handshake", Jan. 24, 2019, [online], [retrieved on Jun. 1, 2021]. Retrieved from the Internet: URL: <https://www.wifi-professionals.com/2019/01/4-way-handshake>, pp. 1-21.

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPv6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Wikipedia, "Pretty Good Privacy", May 16, 2021, [online], [retrieved on Jul. 22, 2021]. Retrieved from the Internet: URL: <https://en.wikipedia.org/w/index.php?title=Pretty_Good_Privacy&oldid=1023418223>, pp. 1-8.

Moon, U.S. Appl. No. 17/378,312, filed Jul. 16, 2021.
Moon, U.S. Appl. No. 17/372,607, filed Jul. 12, 2021.
Moon, U.S. Appl. No. 17/345,057, filed Jun. 11, 2021.
Moon, U.S. Appl. No. 17/343,268, filed Jun. 9, 2021.

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.

* cited by examiner

COMMUNITY SERVER FOR SECURE HOSTING OF COMMUNITY FORUMS VIA NETWORK OPERATING SYSTEM IN SECURE DATA NETWORK

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S. Pub. 2021/0029126, the disclosures all of which are incorporated herein by reference to the extent not inconsistent with this application.

TECHNICAL FIELD

The present disclosure generally relates to a community server for secure hosting of community forums via a network operating system in a secure data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Existing security threats in the Internet can exploit a user entity (e.g., business, association, government agency, etc.) acquiring a user "identity" that enables the user entity to be reached via the Internet. For example, a user entity can acquire a Uniform Resource Identifier (URI) from a prescribed naming authority (e.g., ICANN), and associate the URI with one or more domain name services (DNS); a user entity also can acquire a "social network identity" on an Internet-based service provider (e.g., Facebook, Twitter, etc.). The exposure of a user identity (e.g., URIs, social network identities) enables executable web crawlers of Internet search engines (e.g., Google, Bing, Yahoo, DuckDuckGo, etc.) or Internet-based service providers to data mine user metadata of the user entities, execute analytics to exploit the user metadata, implement unauthorized monetizing of the user metadata, and send unwanted web content to the user (e.g., targeted advertisements, addictive web content targeted for the user, etc.).

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
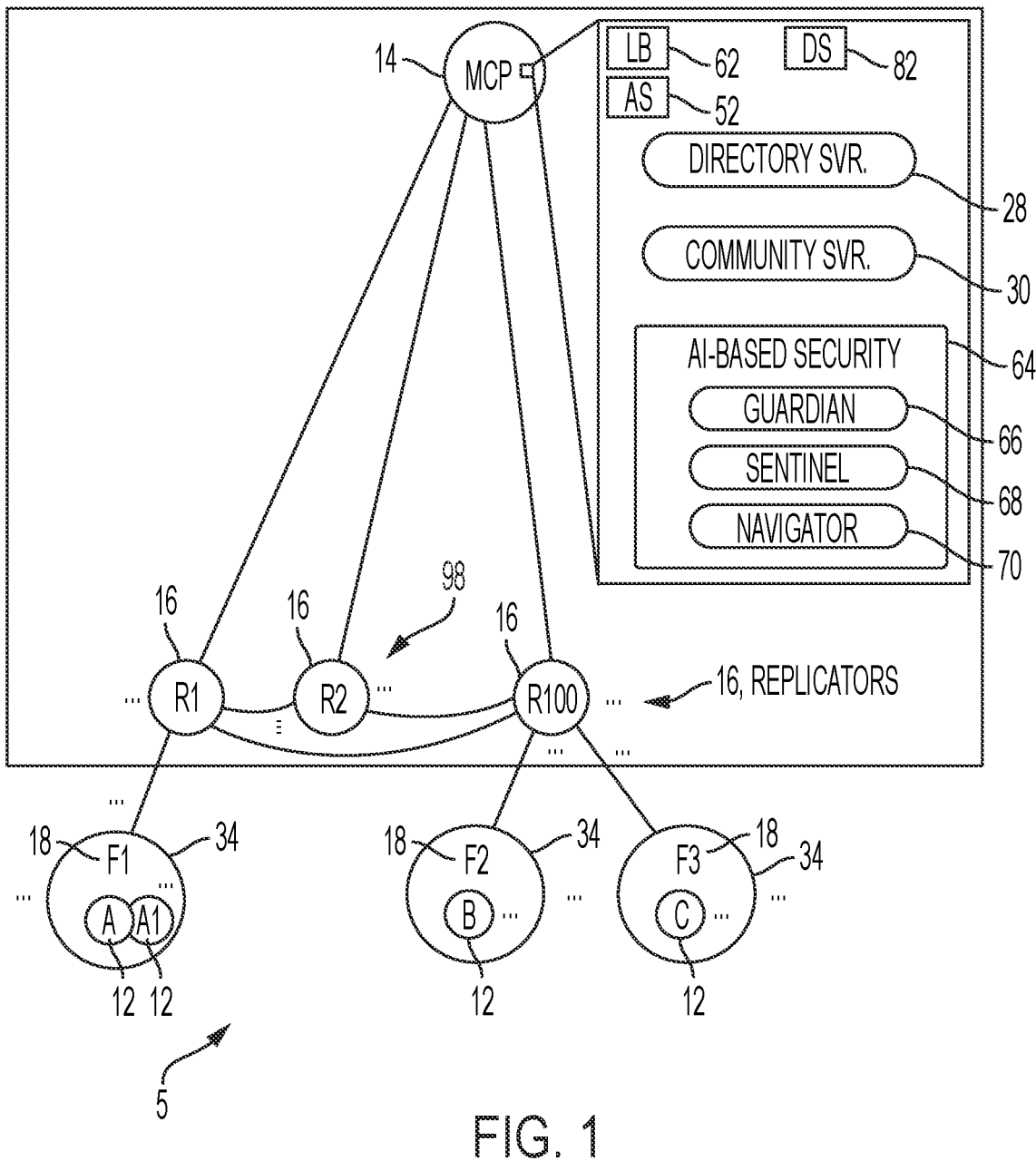
FIG. 1 illustrates a secure peer-to-peer data network comprising an apparatus executing a community server for secure hosting of community forums via a network operating system in a secure peer-to-peer data network, according to an example embodiment.

In one embodiment, a method comprises: receiving, by a secure executable container executed by a network device, a request initiated by a user for a community forum in a secure data network, the user having generated the request via an endpoint device and the user having established a two-way trusted relationship with the endpoint device in the secure data network; processing, by the secure executable container, the request for the community forum in the secure data network, the processing including causing a network device executing a community server to post the community forum in the secure data network according to identifiable features selected by the user; and preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container.

In another embodiment, one or more non-transitory tangible media is encoded with logic for execution by a machine and when executed by the machine operable for: receiving, by a secure executable container executed by the machine implemented as a network device, a request initiated by a user for a community forum in a secure data network, the user having generated the request via an endpoint device and the user having established a two-way trusted relationship with the endpoint device in the secure data network; processing, by the secure executable container, the request for the community forum in the secure data network, the processing including causing a network device executing a community server to post the community forum in the secure data network according to identifiable features selected by the user; and preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container.

In another embodiment, an apparatus comprises apparatus implemented as a physical machine, the apparatus comprising: non-transitory machine readable media configured for storing executable machine readable code; a device interface circuit; and a processor circuit. The processor circuit is configured for executing the machine readable code, and when executing the machine readable code operable for: receiving, by a secure executable container executed by the apparatus implemented as a network device, a request initiated by a user for a community forum in a secure data network, the user having generated the request via an endpoint device and the user having established a two-way trusted relationship with the endpoint device in the secure data network; processing, by the secure executable container, the request for the community forum in the secure data network, the processing including causing a network device executing a community server to post the community forum in the secure data network according to identifiable features selected by the user; and preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container.

DETAILED DESCRIPTION

Particular embodiments enable secure hosting of community forums in a secure peer-to-peer data network, based on distributed execution of secure executable containers in the form of network operating systems in each network device of the secure peer-to-peer data network, and execution of one or more community servers overlying the network operating systems.

The secure hosting of community forums is based on the strict security enforcement by the network operating system executed by any network device within the secure peer-to-peer data network, for example a user endpoint device controlled by a user entity, a replicator device having a two-way trusted relationship with the endpoint device, and/or a core network device having a two-way trusted relationship with the replicator device. The network operating system, implemented within every network device in the secure peer-to-peer data network, provides exclusive access to the secure peer-to-peer data network; in other words, the network operating system (also referred to herein as a "secure executable container") prevents any executable resource in the corresponding network device from accessing any unencrypted form of any "at-rest" or "in-flight" secure data structures, or accessing the secure peer-to-peer data network, without authorized access via a prescribed Application Programming Interface (API) required by the network operating system.

A fundamental problem with existing Internet technology is that the Internet was architected at the network layer (layer 3) with an Internet Protocol (IP) that merely routed data packets between a source device and a destination device, with no regard for anti-fraud protection, protecting user identities, etc. The worldwide deployment of the Internet using Internet Protocol at the network layer thus exposed network devices connected to the Internet to malicious attacks, and exploitation of user identities by service providers that have executed machine learning of user behaviors in order to identify targeted advertising to Internet users, including targeting addictive content.

Moreover, the use of Internet Protocol at the network layer, without any regard for anti-fraud protection or user identity protection at the network layer, resulted in implementing security-based network services (e.g., protecting owned content, building directories, building ontologies, providing security, etc.) "above" the layer 3 (network) layer, typically at the application layer; unfortunately, implementing security-based network services at the application layer cannot prevent a malicious user from reaching a target via the layer 3 Internet, especially since a malicious user often can bypass the OSI (Open Systems Interconnect) protocol stack using unencrypted "raw" data packets that can bypass a TCP/IP stack.

In contrast, the network operating system according to example embodiments maintains exclusive control over all access to the secure peer-to-peer data network and access to any data structure associated with the secure peer-to-peer data network, including any and all user metadata for any user accessing the secure peer-to-peer data network. Further, the network operating system establishes an identity management system that requires a user to verify their identity upon initial registration in the secure peer-to-peer data network.

Consequently, the network operating system can provide a secure hosting of community forums in the secure peer-to-peer data network, based on authoritative establishment of community owners for the community forums, and execution of a community server overlying the network operating system on one or more network devices.

Hence, the example embodiments can ensure that users can enjoy secure communications on community forums in the secure data network, without any unauthorized loss of any privacy rights or media rights. Moreover, the example embodiments can ensure strict enforcement of conduct rules within the community forums and the secure data network in general, as any user that violates one or more policies can be "outcast" from a community forum, and can be banned permanently from any access to the secure data network.

A description will first be provided of the secure peer-to-peer data network, followed by a description of the community server providing secure hosting of community forums via a network operating system in the secure peer-to-peer data network, according to an example embodiment.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
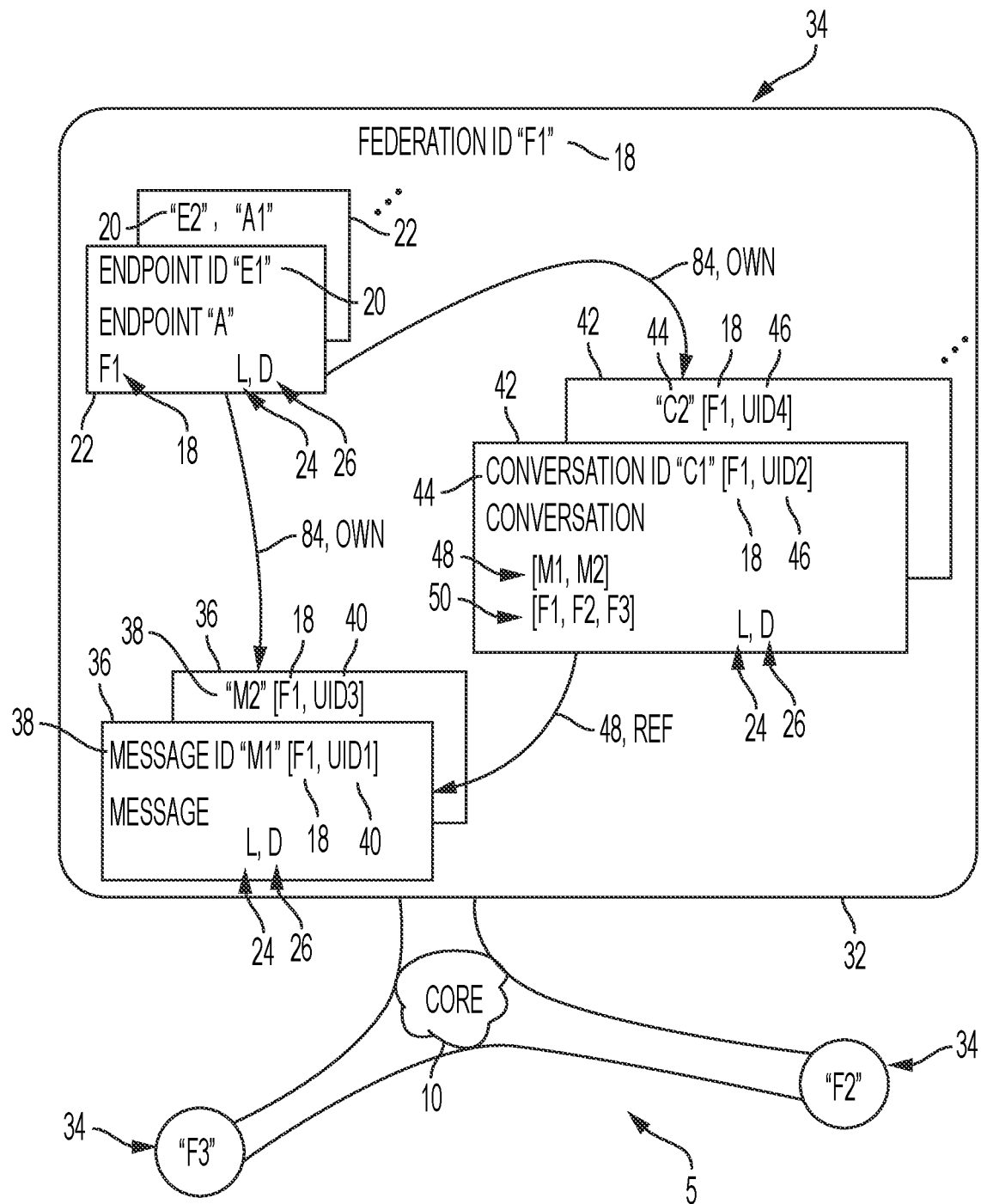
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Each conversation object 42 can reference zero or more message objects 36, and therefore can optionally include a message reference (or message "list") 48 of one or more message objects (e.g., "M1", "M2"); each conversation object 42 also can include a subscriber list 50 specifying at least the federation ID 18 of the federation 34 that created the conversation object 42 (e.g., that created the content in the referenced messages "M1" and "M2" from the message reference 48). A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22: conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
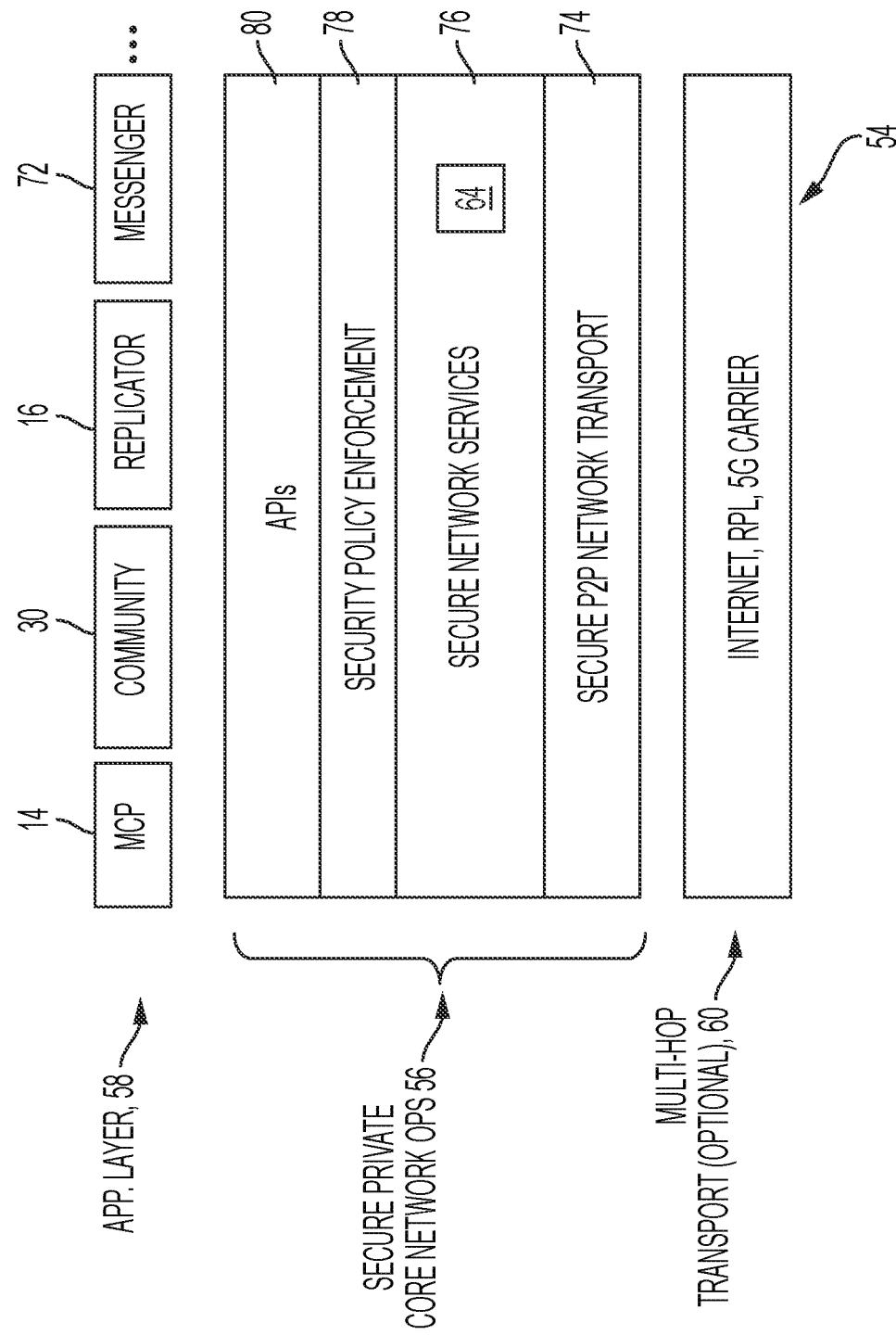
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, N.C., at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Figure 7:
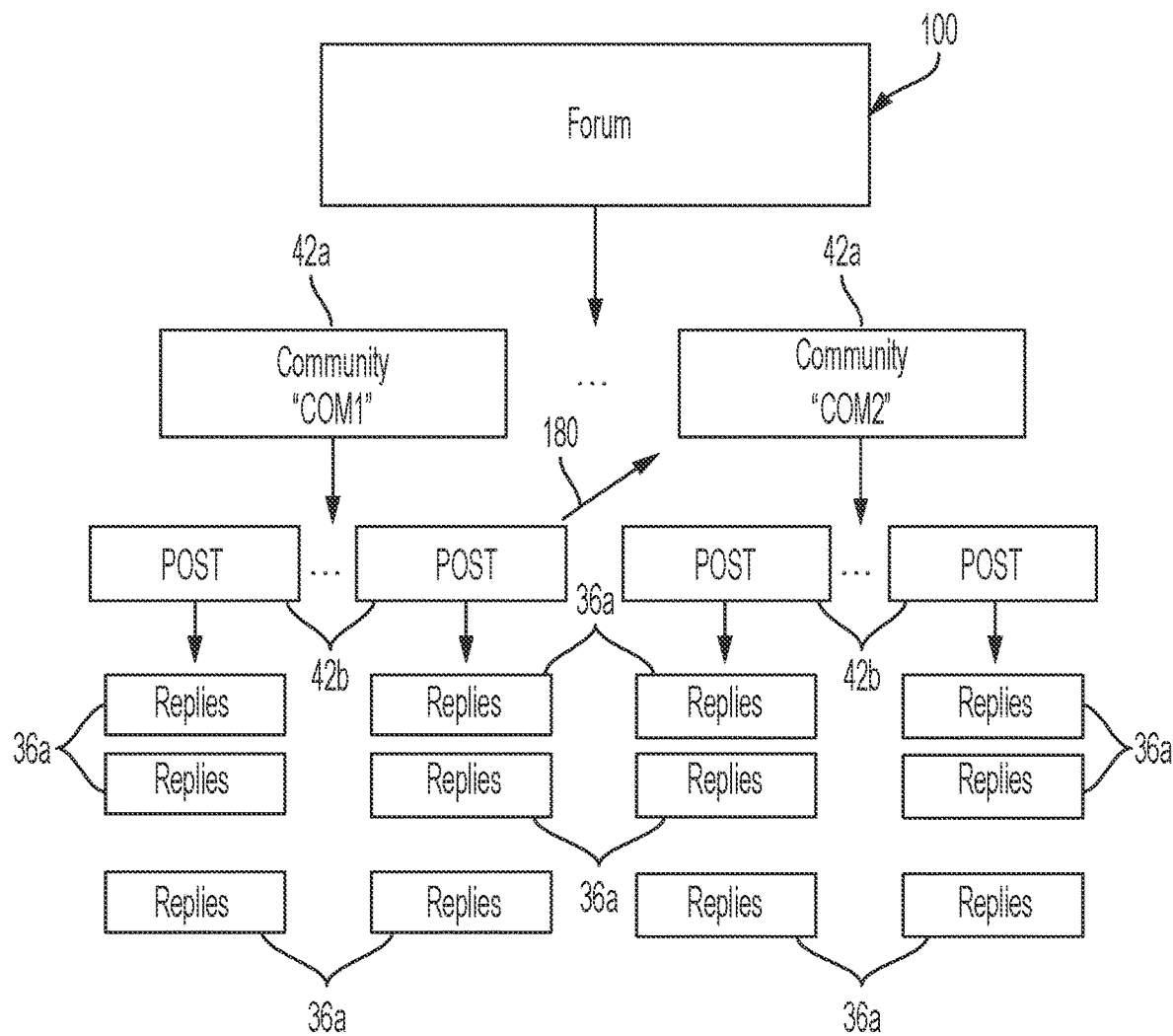
FIG. 7 illustrates in further detail a distributed secure hosting of community forums via a network operating system in a secure peer-to-peer data network using conversation objects and message objects, according to an example embodiment.

Example secure network services 76, illustrated in FIGS. 1, 3, and 7, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

Access to the secure private core network 10 by any physical network device 88 requires installation and instantiation of the network operating system 56. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88) from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 establishes a "closed" access system that requires authorized access via one or more of the APIs 80.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 5), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
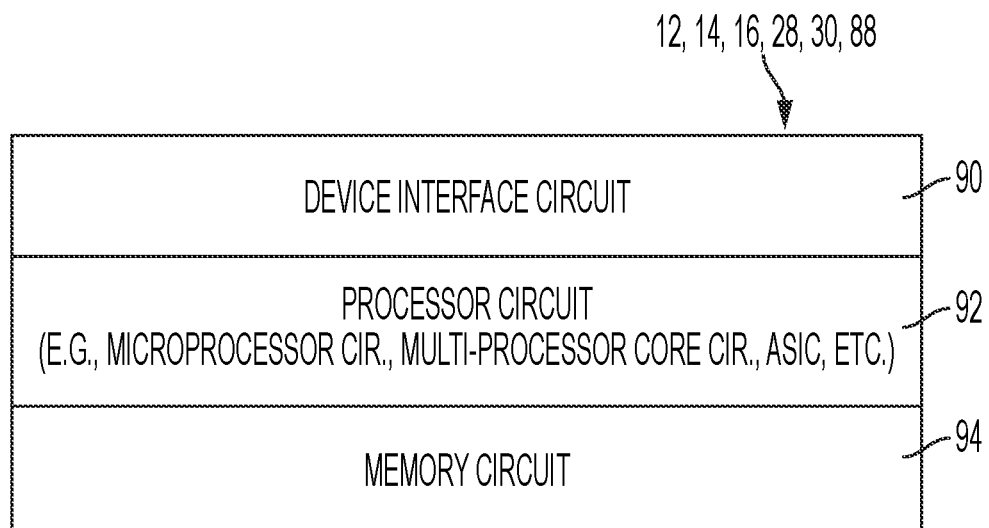
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5:
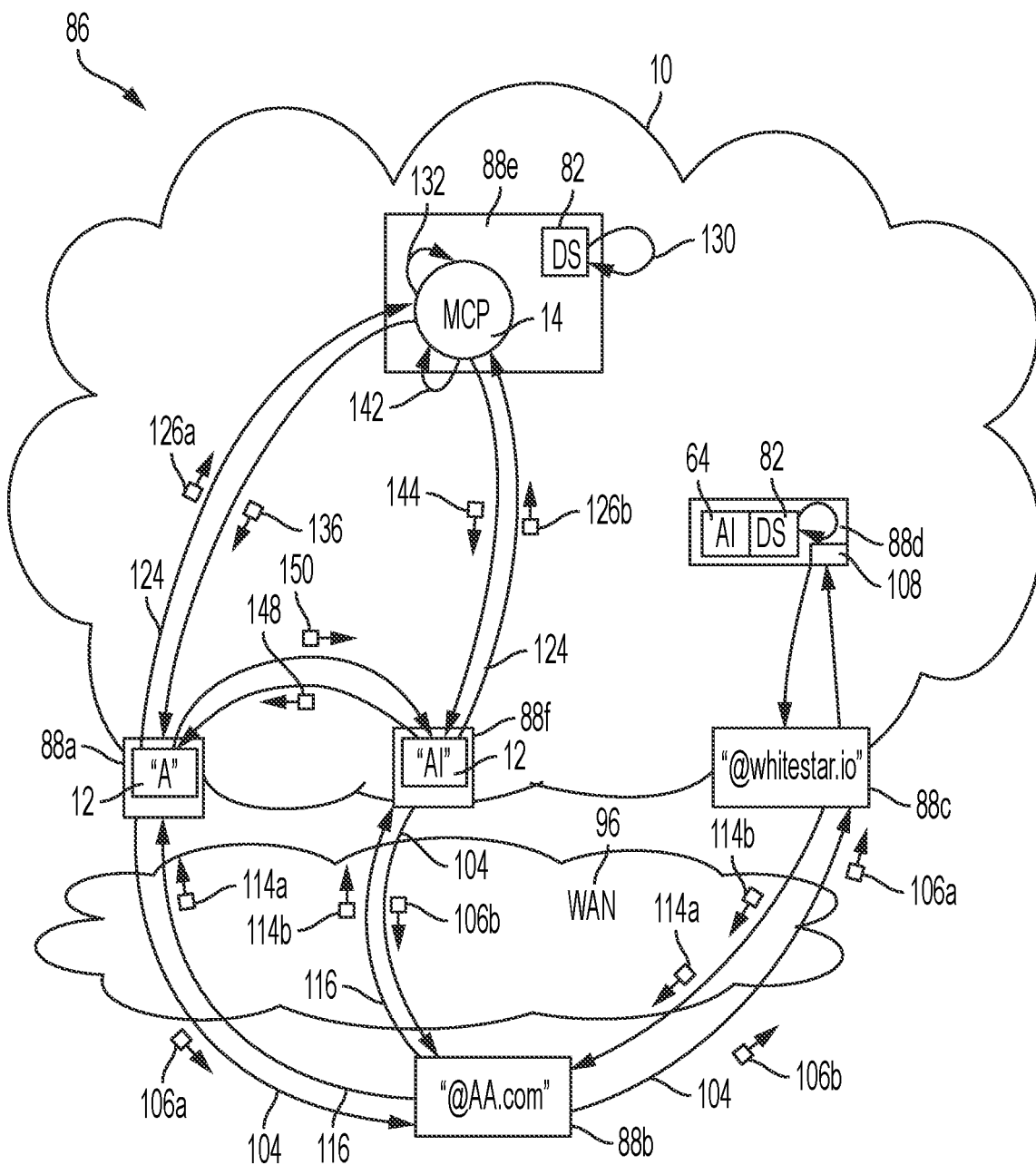
FIG. 5 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIG. 5 illustrates an example identity management system 86 that can be implemented in the secure private core network 10 for secure establishment of trusted relationships in the secure data network 5, according to an example embodiment. A new subscriber "P1" can operate his or her physical network device (88*a* of FIG. 5) to cause the processor circuit 92 of the physical network device 88*a* to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88*a* a command that causes the processor circuit 92 to start ("instantiate") the executable application executing the secure private core network operations 56 on the physical network device 88*a* as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88*a*) receiving the request by the user "P1" to register the physical network device 88*a* as an endpoint device "A" 12, including the external network address (e.g., "P1@AA.com") of the user "P1", the processor circuit 92 of the physical network device 88*a* executing the account management service in the secure network services 76 on the endpoint device "A" 12 can respond to the external network address entry (e.g., email address) by causing the secure network services 76 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send a registration request (containing the secure public key "KeyP1_A") 106*a* to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88*a* can output, via the external data network 96, the registration request 106*a* received from the processor circuit 92 executing the NOS 56 for transmission, via the external data network 96, to a physical network device 88*b* hosting a messaging service (e.g., email server "@AA.com") for the subscriber "P1"; the messaging server 88*b* can forward the message 106*a*, via the external data network 96, to a physical network device 88*c* hosting a messaging service (e.g., email server "@whitestar.io") associated with the secure private core network 10 of the secure peer-to-peer data network 5.

The prescribed destination 108 of the registration request 106*a* can be hosted by the same physical network device 88*c* receiving the registration request 106*a* from the transmitting messaging server 88*b* or a different physical network device (e.g., 88*d*) in the secure private core network 10 (e.g., within a replicator device 16). The physical network device (e.g., 88*c* or 88*d*) hosting the prescribed destination 108 can cause its processor circuit 92 to execute a distributed search (DS) agent 82 in order to execute fraud control using the AI-based security service 64, including determining whether the external network address (e.g., email address "P1@AA.com") specified in the registration request 106*a* has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88*c* or 88*d*) having received the registration request 106*a* can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88*c* or 88*d*) that executed the fraud control can validate that the external network address can be trusted: in response, the distributed search (DS) agent 82 can cause the secure private core network 10 to generate and send a validation response (e.g., email message, text message, etc.) 114*a* to the external network address of the new subscriber "P1" (e.g., email "P1@AA.com" hosted by the physical network device 88*b*) via the external data network 96, where the validation message 114*a* can include the secure public key "KeyP1_A" generated by the secure network services 82 on the new device "A" 12: the secure public key "KeyP1_A" supplied in the registration request can be expressed in the validation message 114*a* in different forms, for example a QR code, a URL, or a text string.

Hence, the new subscriber "P1" can utilize the physical network device 88*a* (or another physical network device 88, as appropriate) to retrieve the validation response from the messaging server 88*b* "out of band" (i.e., outside the secure private core network 10): the validation response 114*a* specifies instructions enabling the new subscriber "P1" to submit the secure public key "KeyP1_A" for validation by the secure network services 82 executed on the new device "A" 12, for example in the form of a machine readable QR code, a URL link, or a machine-readable text string.

In response to the secure network services 82 executed on the new device "A" 12 (by the processor circuit 92 of the physical network device 88*a*) verifying the secure public key "KeyP1_A" in the validation response 114*a*, the secure network services 82 executed on the new device "A" 12 can register the physical network device 88*a* as the endpoint device "A" 12 based on auto-generating (crypto-generating) a federation ID "F1" 18 that is allocated to the email address "P1@AA.com" used by the subscriber "P1", thereby establishing a relationship between the email address "P1@AA.com" and the endpoint device "A" 12. The network operating system 56 executed in the endpoint device "A" 12 (within the physical network device 88*a*) executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A"; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88*a* is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88*a*) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 also can generate a cryptographic nonreversible hash of the external network address (e.g., email address "P1@AA.com"), for example "HASH [P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126*a* comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1@AA.com]→F1" and "F1→['ETD_A' ]") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

The processor circuit 92 of the physical network device 88*e* executing the MCP device 14 can respond to receiving the registration message 126*a* by causing its distributed search (DS) agent (82 of FIG. 1) to execute a projection search on the supplied identifiers "HASH[P1@AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches, the MCP device 14 can register the new federation 34. Hence, the registration message 126*a* enables the MCP device 14, as the prescribed management agent for the secure data network 5, to associate the federation ID "F1" 18 as owning the cryptographic hash "HASH [P1@AA.com]" and the endpoint identifier "EID_A" 20; the registration message 126*a* further enables the MCP device 14 to associate the secure public key "KeyP1_A" with the endpoint identifier "EID_A" 20 owned by the federation ID "F1" 18. As described below, the registration message enables the MCP device 14 to generate and store a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH [P1@AA.com]", "F1" 18 and/or "EID_A" 20 (indicating an absence of any previous use of the cryptographic nonreversible hash), can acknowledge the registration message based on generating and sending to the endpoint device "A" 12 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP)"), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1@AA.com]", "F1" and "EID_A" also can be supplied by the MCP device 14 to the directory server 28 for subsequent projection searches in the secure private core network 10.

The network operating system 56 of the endpoint device "A" 12 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

The same user "P1" can register a physical network device 88*f* as a new device "A1" 12 based on installing and instantiating the network operating system 56 on the physical network device 88*f*, and entering the same external network address (e.g., email address "P1@AA.com") of the subscriber "P1" in response to a prompt by the account management service executed in the secure network services 76 of the network operating system 56; the account management service executed in the secure network services 76 on the physical network device 88*f* can respond to reception of the external network address (e.g., email address "P1@AA.com") by causing the secure network services 76 to generate a unique private key "prvKeyP1_A1" and a public key "KeyP1_A1" for the user "P1" on the new device "A1" 12, and generate and send the registration request (containing the secure public key "KeyP1_A1") 106*b* to the prescribed destination (e.g., "registerme@whitestar.io") 108 associated with the secure peer-to-peer data network 5.

As described previously, receipt of the registration request 106*b* causes a physical network device (e.g., 88*c* or 88*d*) executing the distributed search (DS) agent 82 in the secure per-to-peer data network 5 to execute fraud control, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send a validation response 114*b* to the external network address (e.g., email address "P1@AA.com") of the subscriber "P1", where the validation response can include the secure public key "KeyP1_A1" generated by the secure network services 82 on the new device "A1" 12.

The subscriber "P1" can receive the validation response 114b that specifies instructions (e.g., QR code, URL, text string, etc.) for submitting the included secure public key "KeyP1_A1" for validation. In response to the secure network services 82 executed on the new device "A1" 12 verifying the secure public key "KeyP1_A1" in the validation response 114b, the secure network services 82 executed on the new device "A1" 12 can (temporarily) auto-generate a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" to create a new password for entry into the secure data network 5 via the new device "A1" 12, and by auto-generating (crypto-generating) an endpoint ID 20 for the endpoint device "A1" 12 that is a 128 bit UUID (e.g., "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1") 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate a cryptographic nonreversible hash of the external network address (e.g., the email address "P1@AA.com"), e.g., "HASH[P1@AA.com]", connect to the MCP device 14 (e.g., via an IP address that is made available to the network operating system executed in the endpoint device "A1" 12), and supply a registration message 126b.

The registration message 126b generated by the endpoint device "A1" 12 can specify the cryptographic nonreversible hash "HASH[P1@AA.com]", its federation ID "FA1" 18, and its endpoint ID "EID_A1" that is owned by the federation ID "FA1" (e.g., "HASH[P1@AA.com] 4 FA1" and "FA1→['ETD_A1' ]") (the network operating system 56 executed in the endpoint device "A" 12 also can include its public key "KeyP1_A1"). The network operating system 56 executed in the endpoint device "A1" 12 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 by causing its distributed search (DS) agent 82 to execute a projection search on the supplied identifiers "HASH[P1@AA.com]", "FA1" and/or "EID_A1".

In response to determining a match on the cryptographic nonreversible hash "HASH[P1@AA.com]", the distributed search (DS) agent 82 can cause the MCP device 14 to generate and output to the endpoint device "A1" 12 a secure endpoint acknowledgment 144 indicating another endpoint device "A" 12 exists in its federation 34; the acknowledgment generated also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH[P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 enables the guardian security agent 66 in the network operating system 56 executed in the endpoint device "A1" 12 to decrypt the temporal key, decrypt the acknowledgment, and obtain the secure public key "Key_MCP" of the MCP device 14.

The guardian security agent 66 in the network operating system 56 executed in the endpoint device "A1" 12 can respond to the decrypted acknowledgment (specifying another endpoint is a member of the same federation 34, and that contains the signet for the endpoint device "A" 12) by initiating a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received that the endpoint object 22 specifies a federation ID "F1" 18: the federation ID "F1" 18 in the endpoint object 22 in the salutation acceptance 150 causes the network operating system 56 in the endpoint device "A1" 12 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID from "FA_1" to "F1" in its endpoint object 20, and discard the initial federation ID "FA1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network.

Distributed Crypto-Signed Switching in a Secure Peer-to-Peer Network

The secure storage and transmission of data structures can be extended between different "federations" of network devices, including endpoint devices (established by different users having established respective two-way trusted relationships with the secure peer-to-peer data network), and replicator devices, according to the prescribed secure salutation protocol under the control of the AI based security suite 64. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64.

The guardian security agent 66 can secure (i.e., encrypt) all "at-rest" data structures as first secure data structures for secure storage in the network device, for example based on encrypting each "at-rest" data structure with a corresponding private key: for example, the guardian security agent 66 executed in the endpoint device "A" 12 can secure the "at-rest" data structures using the private key "prvKeyP1_A" that can be dynamically generated by the guardian security agent 66 during initialization of the network operating system 56. The guardian security agent 66 (executed, for example, by the endpoint device "A" 12) also can secure "in-flight" data structures as second secure data structures based on dynamically generating a temporal key "TK", and encrypting the temporal key 68 with a public key (e.g., "Key_B") of a destination device (e.g., the endpoint (device "B" 12, ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

In particular, the guardian security agent 66 of a source network device (e.g., an endpoint device "A" 12) can encrypt an "in-flight" data packet into a secure data packet based on dynamically generating a unique temporal key (e.g., "TK") used for encrypting a data packet payload into an encrypted payload, and encrypting the unique temporal key into an encrypted temporal key (e.g., "ENC(Key_B) [TK]") using a secure public key (e.g., "Key_B") of a destination device (e.g., endpoint device "B" 12) identified within a destination address field (e.g., "DEST=B"). In other words, the guardian security agent 66 of the source endpoint device dynamically generates a new temporal (e.g., time-based) key "TK" for each secure data packet to be transmitted, ensuring no temporal key is ever reused; moreover, the encrypted temporal key ensures that only the destination device can decrypt the encrypted temporal key to recover the temporal key used to encrypt the payload.

The guardian security agent 66 of a source network device (e.g., an endpoint device "A" 12) also can digitally sign the packet (containing the encrypted payload and encrypted temporal key) using the endpoint device A's private key "prvKeyP1_A" to generate a source endpoint signature. Hence, the guardian security agent 66 can generate the secure data packet for secure "in-flight" communications in the secure peer-to-peer data network 5.

Figure 6:
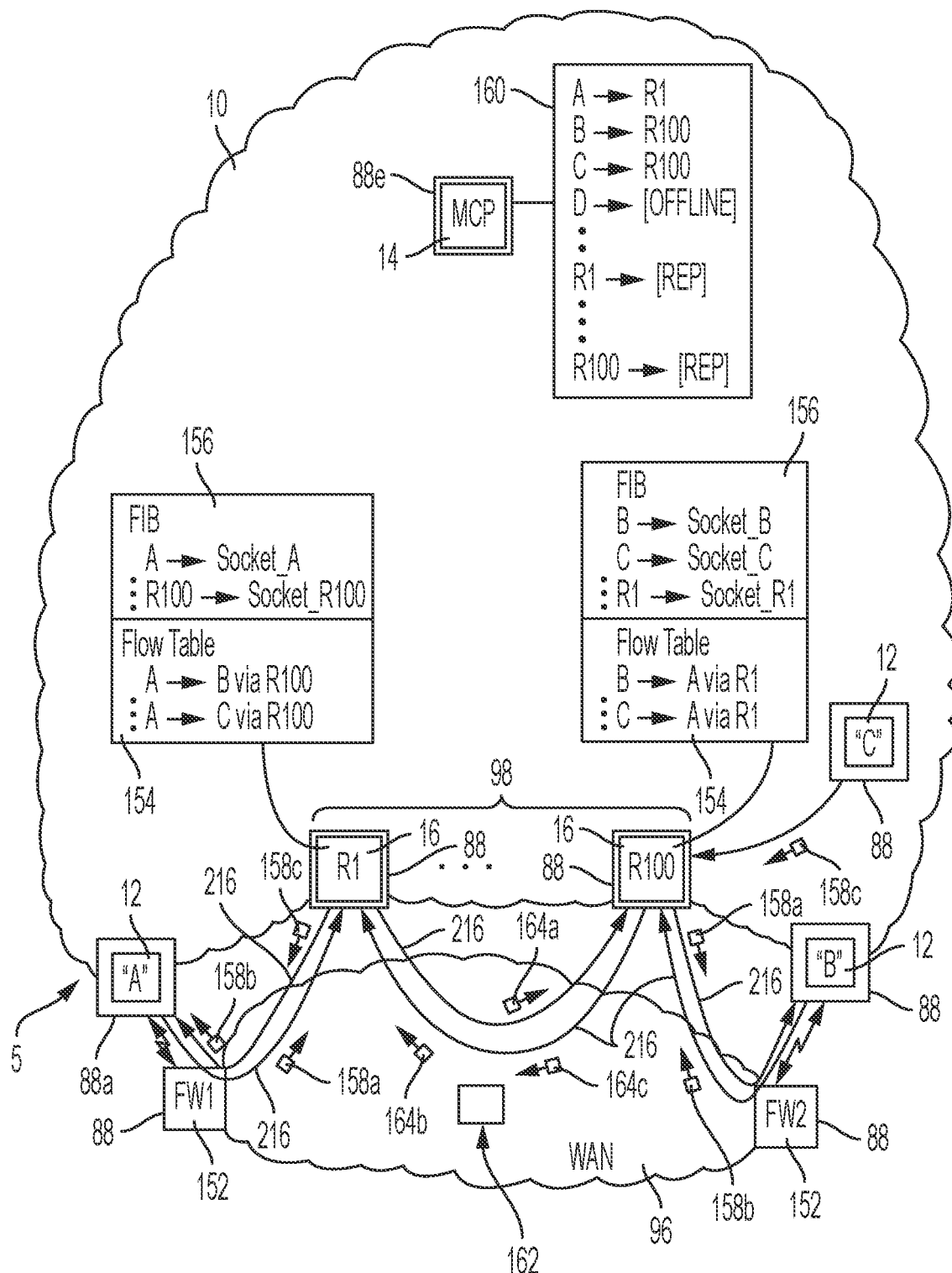
FIG. 6 illustrates crypto-signed switching between two-way trusted network devices in a secure peer-to-peer data network, according to an example embodiment.

The source endpoint signature generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 6) in possession of the public key "KeyP1_A" to validate that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 6) has a two-way trusted relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 6) can validate an identity for a received secure data packet 158, based on validating a source endpoint signature using the corresponding public key (e.g., "KeyP1_A") of the source network device (e.g., the endpoint device "A" 12), and based on the guardian security agent 66 of the receiving network device determining that it has a two-way trusted relationship with the source network device identified in the source address field.

The guardian security agent 66 of each of the replicator devices "R1" and "R100" 16 also can enforce crypto-signed switching based on validation of a replicator signature. In particular, following validation of the secure data packet 158, the guardian security agent 66 of the replicator device (e.g., "R1") 16 can cryptographically sign the secure data packet, using its private key "prvKey_R1" to generate a replicator signature for secure transmission to its trusted peer replicator device "R100" 16 as a secure forwarded packet (e.g., 164*a*) containing the secure data packet (e.g., 158*a*) and the replicator signature, ensuring no network node 162 in the underlying external data network 96 can decrypt the secure data packet (e.g., 158*a*) contained in the secure forwarded packet (e.g., 164*a*).

Similarly, the guardian security agent 66 of a replicator device (e.g., "R100") 16 can determine that the cryptographically-signed secure forwarded packet (e.g., 164*a* of FIG. 6) is received from a trusted peer replicator device (e.g., "R1") 16, and can execute validation of the secure forwarded packet (e.g., 164*a*) based on verifying the replicator signature in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158*a*) by forwarding the secure data packet (e.g., 158*a*) to its attached destination endpoint device (e.g., "B") 12, maintaining the cryptographic security of the secure data packet (e.g., 158*a*) for decryption by the attached destination endpoint device "B" 12 following validation of the secure data packet (e.g., 158*a*) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The navigator security agent 70 of an endpoint device (e.g., the endpoint device "A" 12) can enable secure communications to be established through a firewall (e.g., "FW1" 152 of FIG. 6) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 6, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10. The MCP device 14 also causes the guardian security agent 66 of each endpoint device 12, during registration with the MCP device 16 (or in response to the endpoint device 12 returning from an "offline state" to an "online" state), to establish a two-way trusted relationship with an identified replicator device (selected by the MCP device 16) based on executing a prescribed secure salutation protocol with the identified replicator device 16; hence, the navigator security agent 70 executed in the endpoint device "A" 12 can create an entry specifying that a replicator device is reachable via an identified wireless data link between the endpoint device "A" 12 and the firewall device "FW1" 152.

The MCP device 14 also can identify, for a requesting replicator device (e.g., "R1") 16, a peer trusted replicator device (e.g., "R100") 16 for reaching a destination endpoint device (e.g., "B"), even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. The navigator security agents 70 of the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of the any data traffic transmitted by endpoint devices "A" or "B".

The replicator devices "R1" and "R100 16 can create a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12.

Figure 8:
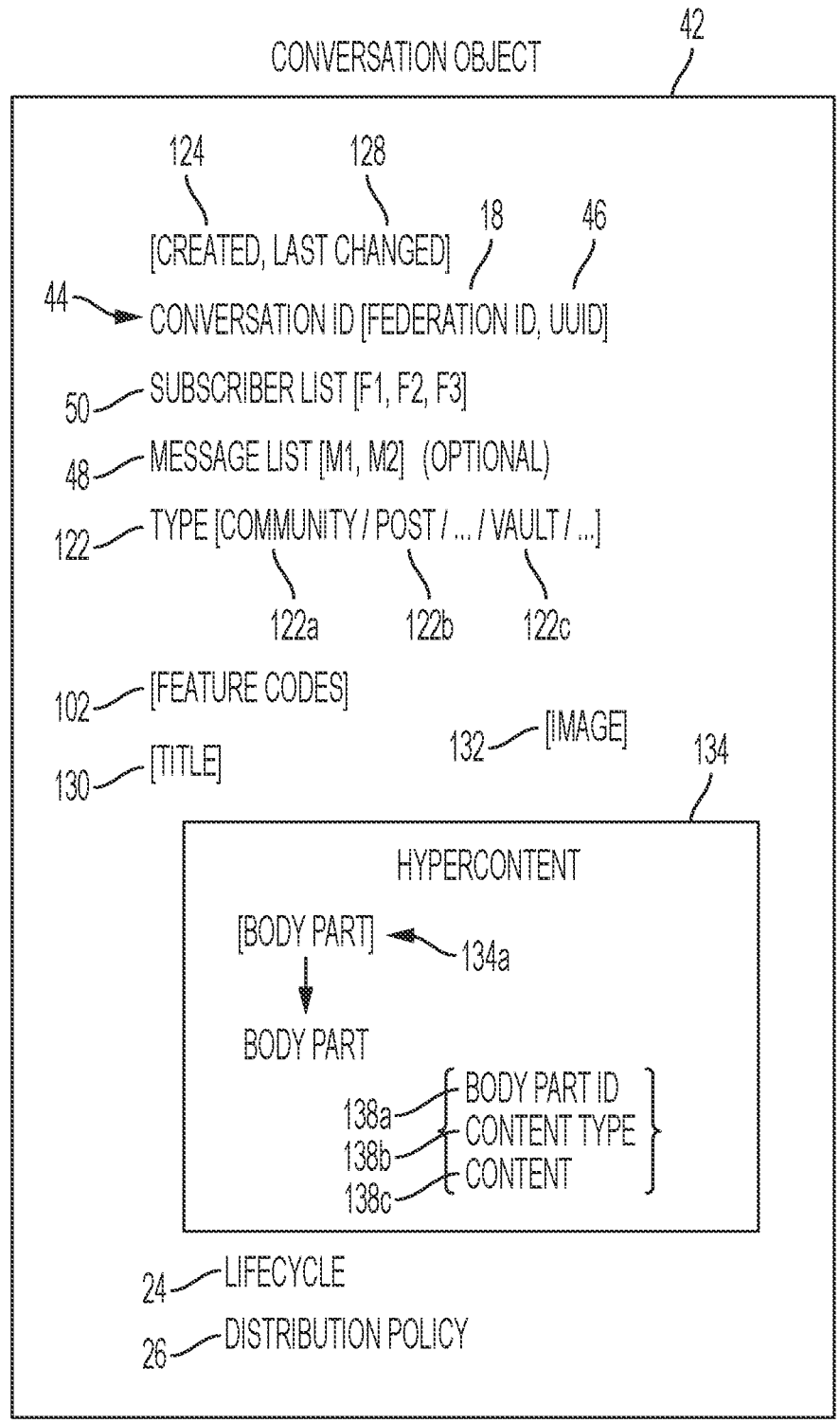
FIG. 8 illustrates a conversation object that is generated for secure hosting of community forums via a network operating system in a secure peer-to-peer data network, according to an example embodiment.

Hence, the navigator security agent 70 enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158*a* of FIGS. 7 and 8). The state entry created by the security appliance 152 also can be updated in response to the endpoint device "A" 12 sending a secure data packet (e.g., 158*a*) to its replicator device (e.g., "R1") 16; hence, the state entry created by the secure appliance (e.g., "FW1") 152 enables the replicator device (e.g., "R1") 16 to send a second secure data packet (e.g., 158*b*) back to the endpoint device (e.g., "A") 12 via the secure appliance (e.g., "FW1") 152.

The sentinel security agent 68 can detect a replay attack based on executing a prescribed hash on each encrypted temporal key within a received secure data packet 158. In particular, the encrypted temporal key not only ensures that the destination device is the only network device in the secure peer-to-peer data network 5 that can decrypt the encrypted payload: the encrypted temporal key also provides for the secure data packet a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Hence, the sentinel security agent 68 of an endpoint device 12 can respond to receiving a secure data packet 158 (or the sentinel security agent 68 of a replicator device 16 can respond to receiving a secure forwarded data packet 164) by retrieving an encrypted bitstring from the "encrypted temporal key field", and executing its own prescribed hash (e.g., using its own unique hash parameters) to generate a hashed value of at least a portion of the encrypted bitstring (corresponding to the encrypted temporal key). The sentinel security agent 68 can compare the hashed value with other stored hash values (e.g., previously stored in a data structure within its memory circuit 94) to determine whether the hashed value equals a prior instance of a hashed value for a prescribed time interval (e.g., one minute).

It is mathematically impossible for hashes of different encrypted temporal keys to have an identical hash value unless the data packet 158 (or 164) is copied: hence, the sentinel security agent 68 executed by the processor circuit 92 of any physical network device 88 can determine that the secure data packet 158 (or 164) is not a copy based on a determined absence of a prior instance of the prescribed hash, and can continue processing the secure data packet 158, including storing the prescribed hash for future comparisons for subsequently-received secure data packets 158 or 164, for example for a corresponding identified source-destination flow.

Conversely, any sentinel security agent 68 can detect a replay attack in response to determining the prescribed hash from the received secure data packet 158 matches a prior instance of the prescribed hash on a previously-received secure data packet 158, indicating the secure data packet is a copy of a previously-received data packet.

Secure Hosting of Community Forums by Community Server Via Network Operating System FIG. 7 illustrates the hosting and rendering of community forums 100 in the secure peer-to-peer data network 5 via the network operating system 56 of FIG. 3, according to an example embodiment.

As described previously, the network operating system 56 implements all executable services associated with security in the secure data network 5, including encryption of in-flight and at-rest data structures, identity protection, enforcing privatization of user metadata, secure outcasting of bad actors, intrusion prevention, etc. The network operating system 56 retains exclusive control to any access of the secure data network 5, or to any access of any in-flight and at-rest data structures associated with a user interacting with the secure data network 5. Hence, all applications and all users can interact in the secure data network 5 with trust and knowledge that all network-based services, user identities, user data, user metadata, etc., are secured in the secure data network 5 by the distributed execution of the network operating system 56.

As described previously with respect to FIG. 3, the application layer 58 in a physical network device 88 can include one or more executable applications overlying the network operating system 56, for example an MCP application 14, a community server application 30, a replicator application 16, a messenger application 72, etc.; further, each executable application in the application layer 58 can access the secure peer-to-peer data network 5 (or any secure "at-rest" or "in-flight" data structure associated with the secure peer-to-peer data network 5) only via a prescribed API 80 of the network operating system 56. In other words, no user or no physical network device 88 can access the secure data network 5 (or the secure private core network 10) without installation of the network operating system 56 and authorized registration with the identity management system 86 via the network operating system 56. The secure executable container 56 prevents any executable resource in the network device 88 (at the application layer 58) from accessing the secure data network 5, accessing any unencrypted form of any first secure data structure stored in the network device 88, or accessing any second secure data structure generated for secure communications in the secure data network 5, without authorized access via a prescribed Application Programming Interface (API) 80 required by the secure executable container 56.

Hence, the execution of the network operating system (i.e., the secure executable container) 56 in each physical network device 88 providing access to the secure data network 5 establishes a distributed execution and enforcement of security operations throughout the secure data network 5. The distributed execution of security operations in the secure data network 5 by the network operating system 56 in each physical network device 88 also enables establishment of a distributed execution of a secure hosting of community forums 100 via the network operating system 56. As described below, one or more community forums 100 can be hosted by or more network devices in the secure data network 5, for example an endpoint device 12, a core network device (e.g., 88e), based on the one or more network devices executing the community server 30 illustrated in FIG. 1.

FIGS. 1, 3, and 5-10 illustrate that community forums 100 can be hosted by one or more community servers 30 in the secure peer-to-peer data network 5, where the community server 30 (overlying the network operating system 56) can be executed by a core network device (e.g., 88e), another core network device (e.g., 88d) providing a distributed execution of the community server 30 in the secure private core network 10, or an endpoint device 12 that can host an unlisted community forum, based on generation and distributed processing of a conversation object (42 of FIG. 8).

Hence, each network device 88 can perform a distributed execution of secure hosting of community forums 100 by the community server 30. For example, the secure executable container 56 executed by the network device 88 can receive (e.g., in operation 104 of FIG. 9A) a request for an operation associated with a community forum 100 in the secure data network 5, where the request is generated in operation 104 by a federation user (e.g., "F1") 34 via an endpoint device (e.g., "A") 12 following the federation user (e.g., "F1") 34 having established a two-way trusted relationship with the endpoint device (e.g., "A") 12 as described previously with respect to FIG. 5. The secure executable container 56 can execute distributed processing of the request for the community forum 100 in the secure data network 5, where the distributed processing (e.g., in operations 110, 112, 116, 118, and 120 of FIG. 9A) includes causing a network device 88 executing a community server 100 (e.g., within the same network device 88 or a different network device 88) to post in operation 118 the community forum 100 in the secure data network 5 according to identifiable features selected by the user.

In the case of an endpoint device 12 of a federation user (e.g., "F1") 34, the secure executable container 56 can receive in operation 104 the request from a messenger application 72 or a community builder application (described below) at the application layer 58 via the prescribed API 80. The secure executable container 56 in the endpoint device (e.g., "A") 12 in operation 110 can execute distributed processing based on generating a conversation object 42*a* (of type "community" 122*a* or "community object") for a new community, or a conversation object 42*b* (of type "post" 122*b* for a "post object") for a new message post within an identified community: as illustrated in FIG. 2 and FIG. 8 (described below), generation of the conversation object 42*a*/42*b* in operation 110 can include creating a conversation identifier 44 (comprising the federation ID 18 and a UUID 46), and adding identifiable features (feature codes) (102 of FIGS. 8 and 10); the distributed processing by the secure executable container 56 in the endpoint device (e.g., "A") 12 also can include securely sending in operation 112 the conversation object 42*a*/42*b* to the community server 30 (e.g., hosted with the MCP device 14 in the physical network device 88*e*), and registering the conversation object 42*a*/42*b* with the directory server 28 executed in the MCP device 14, for example based on sending the conversation object 42*a*/42*b* as a secure data packet to its associated replicator device (e.g., "R1") 16. If the community server 30 is executed in the same endpoint device that generated the request for the new community, the network operating system 56 that created the conversation object 42*a*/42*b* can forward the conversation object 42*a*/42*b* to the community server 30 via the prescribed API 80.

The network operating system 56 executed in the replicator device "R1" 16 can determine in operation 116, following validation of the secure data packet, that the conversation object 42*a* (or 42*b*) is of type "community" (or "post"), causing the replicator device "R1" to securely send the conversation object 42*a* (or 42*b*), via the API 80 provided by the network operating system 56 executed in the replicator device 16, to the community server 30 via the secure private core network 10, and to securely send the conversation object 42*a* (or 42*b*) to the directory server 28 for registration of the conversation object 42*a* (or 42*b*) in the secure data network 5.

If the community server 30 for the conversation object 42*a*/42*b* is hosted in another endpoint device (e.g., "B") 12 in which the endpoint device "A" 12 has a trusted two-way relationship), the network operating system 56 in the endpoint device "A" 12 can execute a secure transmission to the community server 30 executed in the destination endpoint device (e.g., "B") (e.g., via one or more replicator devices 16 or a secure peer-to-peer data link), which can cause the network operating system 56 in the endpoint device "A" 12 (in operation 112) and/or the destination endpoint device "B" (in operation 118) to update the directory server 28 of the conversation object 42*a*/42*b* hosted by the community server 30 executed in the destination endpoint device "B" 12.

In the case of a destination network device (e.g., the MCP device 14) hosting the community server 30 receiving the request in the form of the secure data packet, the network operating system 56 in operation 118 can execute distributed processing on the secure data packet based on verifying and decrypting the secure data packet to recover the request that was generated by the endpoint device 12 in the form of a conversation object 42*a*/42*b*, detecting that the conversation object 42 is of type "community"/"post", and in response forwarding the conversation object 42*a*/42*b* to the community server 30. Hence, the conversation object 42*a*/42*b* forwarded by the network operating system to the community server 30 (via the API 80) can cause the community server 30 in operation 118 to host the community forum 100 defined by the conversation object 42*a* (or host the post message within the community 100 defined by the conversation object 42 that is referenced in the post object 42*b*), including secure storage and secure distribution of the conversation object 42*a*/42*b* to requesting network devices, described below. Depending on implementation, the community server 30 in operation 118 can update the directory server 28 (via the API 80) of the new/updated conversation object 42*a* and/or 42*b*.

Any update to the directory server 80 causes the network operating system 56 underlying the directory server 28 to execute distributed processing based on validating the request (in the form of a secure data packet) containing the new/updated conversation object 42*a* and/or 42*b* (or at least a portion thereof). Hence, the network operating system 56 underlying the directory server 28 executes the distributed processing based on causing the directory server 28 to generate in operation 120 an index for identification of each community object 42*a* and each post object 42*b* referencing a community object 42*a*. Hence, the directory server 28 can respond to projection searches regarding any community (defined by its corresponding community object 42*a*), any post message within a community (defined by the corresponding post object 42*b* that references its community object 42*a*), and/or any message object 36*a* implemented as a reply message to any post 42*b*.

The following description provides additional details regarding the distributed execution of the secure hosting of the community forums based on the community objects 42*a*, the post objects 42*b*, and the reply objects 36*a*.

FIG. 1 illustrates a community server 30 that can be executed within the secure private core network 10 overlying the network operating system 56, for example by a network device 88*e* that also can execute the MCP device application 14 of FIG. 3. The example execution of a community server 30 by a network device 88 in the secure private core network 10 ensures "always-on" persistence of any community object 42*a* and/or post object 42*b* hosted by the community server 30. In one example, the community server 30 executed by the network device 88*e* can be controlled by the service provider implementing the secure private core network 10; additional network devices 88 in the secure private core network 10 can be deployed for distributed execution of the community server 30.

In another example, a private federation entity (e.g., "F3") 34 can host its own community server 30 for its own communities 100 that are discoverable by the directory server 28 in the secure private core network 10.

The community server 30 executed in a network device (e.g., 88*e*) in the secure private core network 10 can host three different types of communities 100, namely: an open community, a private community, or an unlisted community. An open community is publicly available and searchable in the secure data network 5 via the directory server 28, and any federation entity can join the publicly available open community. A private community is publicly available and searchable in the secure data network 5 via the directory server 28; however, joining the private community requires approval of the federation entity that owns the private community (e.g., a subscription may be required of a federation entity desiring to join). Hence, a private community is available only to selected trusted federation entities having received approval from the owner of the private community.

An unlisted community can be hosted by the community server 30 but is not registered on the directory server 28 and therefore is not discoverable in the secure data network 5; hence, access to the unlisted community requires private invitation by the community owner, for example based on the community owner providing a signet to a federation entity desiring to join the unlisted community. In the case of an unlisted community, the community object 42*a* and any post objects 42*b* are not indexed by the directory server 28 and are therefore unsearchable. A federation entity 34 can join an unlisted community only by receiving a secure invitation (e.g., in the form of a signet) from the community owner; further, any post objects 42*b* or reply objects 36*a* in an unlisted community must be "published" directly to the participants 50 because none of the post objects 42*b* or reply objects 36 of an unlisted community are detectable by the directory server 28. Hence, an unlisted community can be hosted within the community server 30 without the necessity of any projection search by the directory server 28.

Each community 100 is established based on creation of a corresponding conversation object 42*a*. As illustrated in FIG. 8 and as described previously with respect to FIG. 3, each conversation object 42 has an owner that is uniquely identified by the corresponding federation ID 18 that is part of the conversation ID 44. Hence, each community 100 is owned and controlled by the federation entity 34 that created the conversation object 42*a* that defined the community 100; hence, the federation entity 34 specified in the conversation ID 44 of the conversation object 42*a* is the community owner.

The community owner (identified by their federation ID in the conversation ID 44) has prescribed rights for controlling implementation of the community 100, where the prescribed rights can be explicitly specified as feature codes (102 of FIG. 8). For example, a community owner can designate within the feature codes 102 one or more delegated moderators, authority to delete content in the community (even content not owned by community owner); the community owner can designate within the feature codes 102 authority to outcast members, set guidelines for content types (e.g., the Motion Picture Industry Association (MPIA) ratings such as U, G, PG, PG13, R, NC17), etc. A community owner can designate within the feature codes 102 authority to act as the "gatekeeper" or administrator of the owned community: for example, any federation entity can join a public community, however a community owner can still outcast a community subscriber that violates terms set by the community owner. As described previously, a community owner of a "closed" (e.g., private or unlisted) community decides whether a federation entity can subscribe to the closed community.

An owner of an open community can be established in the secure data network 5 as an "affiliate" entity. An "affiliate" entity is a federation entity 34 that can be registered in the secure data network 5 (e.g., in the MCP device 14) as having been granted privileges in the secure data network 5 to own an open community forum 100. In one example, a federation entity 34 can be identified (e.g., in the MCP device 14) as an affiliate entity based on a subscription agreement with the service provider that maintains the secure private core network 10, for example as part of a subscription fee with the service provider, or a revenue-sharing arrangement between the affiliate entity and the service provider.

An affiliate entity is implemented as a federation entity 34 having a corresponding unique federation ID: the affiliate can be a content producer that can invite other federation users 34 to access, via the secure data network 5, content of the affiliate via one or more communities 100 owned by the affiliate.

An affiliate entity can obtain from the secure data network 5, for example, an application (e.g., a "community builder" application) executable at the application layer 58 that can be executed on an endpoint device 12 of the affiliate entity. The community builder application (separate and distinct from the community server 30) can be executed overlying the network operating system 56, enabling the community builder application to implement the online community via a prescribed API 80.

Figure 9A:
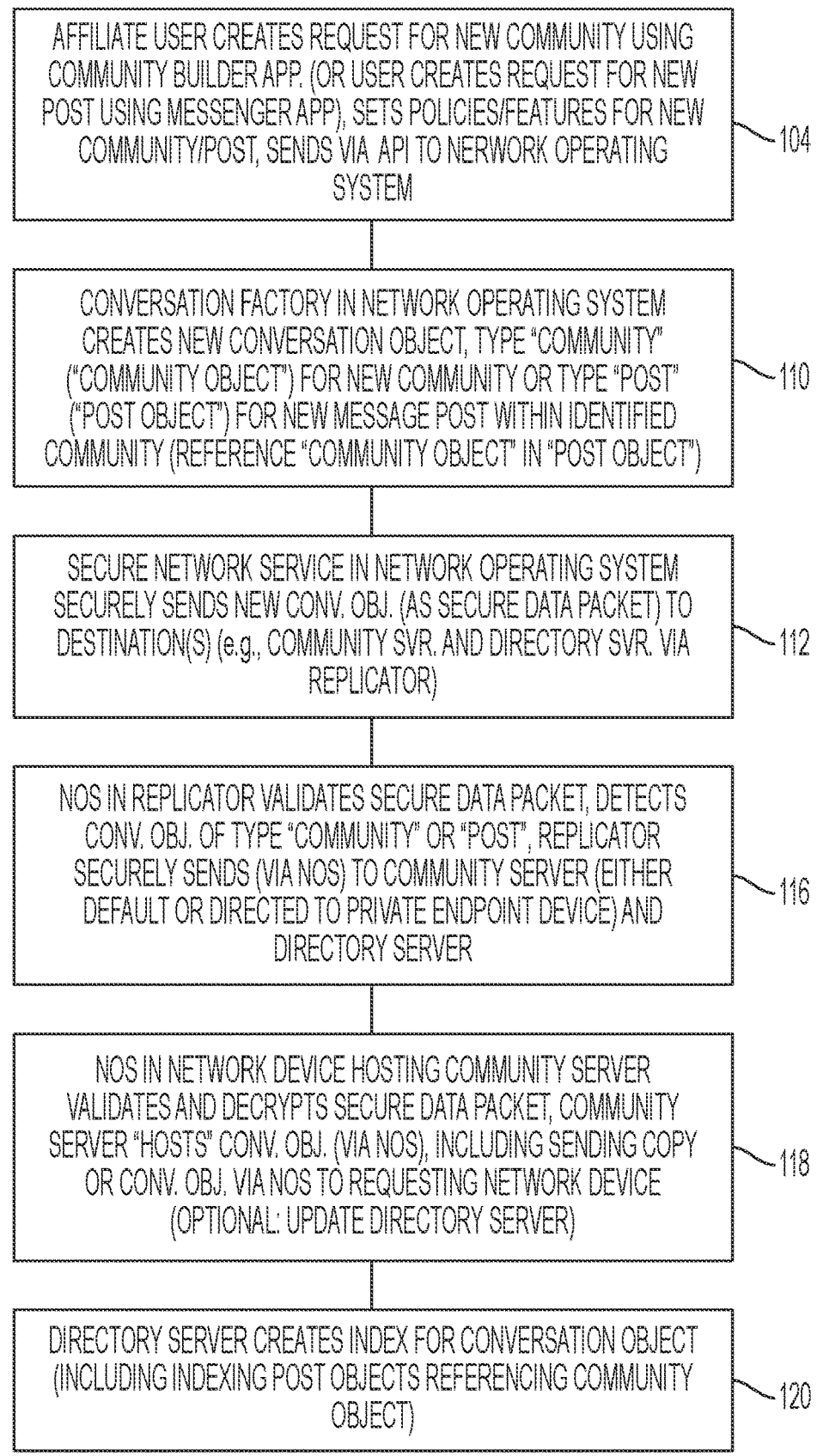
FIGS. 9A-9B illustrate distributed secure hosting of community forums using a community server via a network operating system in a secure peer-to-peer data network, according to an example embodiment.

The affiliate entity can execute the community builder application for generation of a new open community forum 100 having one or more open communities: the community builder application in operation 104 of FIG. 9A can send, via the API 80, one or more requests for generating an open community. The one or requests received by the network operating system 56 in operation 104 (including policies and features) can cause a conversation factory in the secure network services 76 of the network operating system 56 to generate a corresponding conversation object 42 of type "community", referred to also as a community object 42*a*.

FIG. 8 illustrates an example conversation object 42 that can be generated in operation 110 by an executable conversation factory, in the secure network services 76 of the network operating system 56, according to an example embodiment. As described with respect to FIG. 2, each conversation object 42 includes a conversation ID 44 (comprising the federation ID 18 of the federation entity 34 that created the conversation object 42) and a UUID 46. Each conversation object 42 also includes a subscriber list 50 of federation entities having subscribed to the conversation object, including at a minimum the federation ID 18 of the conversation object owner (e.g. "F1") that created the conversation object 42. The conversation object 42 also includes a lifecycle policy "L" 24 and a distribution policy "D" 26.

As illustrated in FIG. 8, the conversation object 42 generated by the conversation factory includes a creation timestamp 124 indicating a time that the data object was created, and a "last change" timestamp (i.e., update timestamp) 128 indicating the last time the data object was updated. The conversation object 42 also comprises a type field 122 that identifies the "type" of the conversation object 42. A community forum 100 is implemented as having one or more "communities", where each community is implemented based on the type (or "kind") field 122 specifying the type "community" 122*a*. Example conversation object types 122 can include community 122*a*, message post ("post") 122*b*, experience, system notification, load balancer, a secure compartmentalized information folder (SCIF), a video conference, an arcade, a shared calendar, a secure vault file system (i.e., secure encrypted file system) 122*c*, federated settings, etc.

Hence, a federation user (e.g., "F2") 34 can generate a community based on creating, using a community builder application (overlying the network operating system 56), a conversation object 42 having a type (or "kind") "community" 122*a*: the conversation object 42 of type "community", also referred to herein as a "community object", is a first class data object in the secure data network 5. The conversation object 42 generated in operation 110 by the conversation factory in the secure network services 76 of the network operating system 56 also can include an optional reference 48 of zero or more message objects 36 associated with the conversation object 42. The conversation object also can include one or more hypercontent fields, for example a title field 130, an image field 132, and a hypercontent portion 134. The hypercontent portion 134 can include one or more body parts 134a, each including a body part ID 138a, a body part content type 138b, and a reference 138c to the body part content (or the actual body part content embedded therein). Hence, the conversation object 42 can be self-describing similar to a message, and the hypercontent 134 in the conversation object can updated dynamically, described below.

A conversation object 42 also can include a set of feature codes 102 that describe the enforceable features, attributes, and policies of the conversation. Hence, a community object 42a (i.e., a conversation object 42 of type "community" 122a) can include feature codes 102 that specify the features, attributes, and policies that define the community that is generated during processing of the community object 42a by the hosting physical network device 88.

Figure 10:
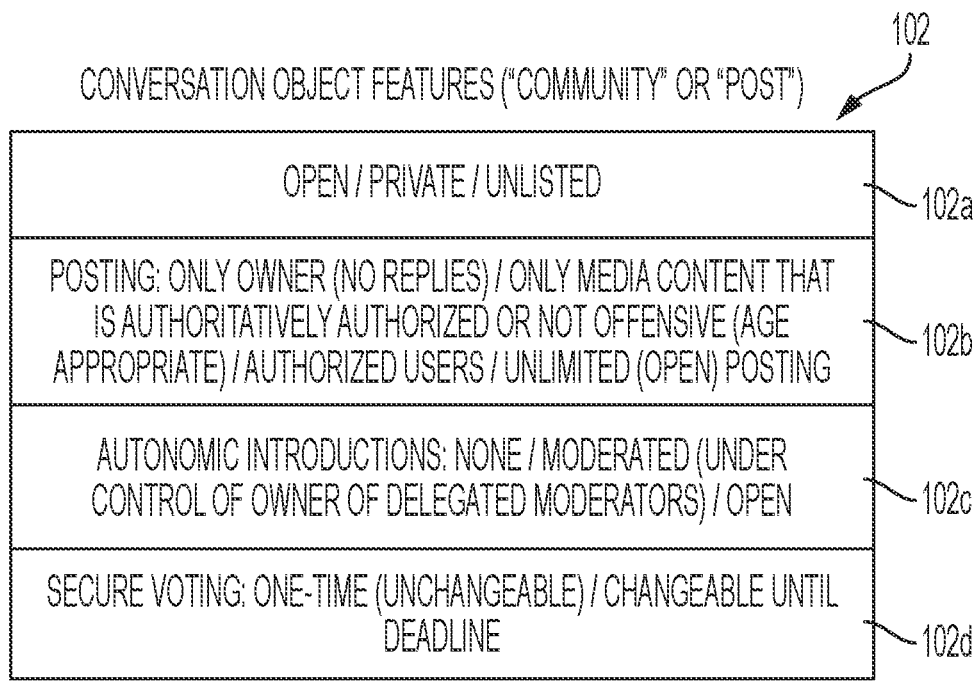
FIG. 10 illustrates example feature codes that can be implemented in a conversation object for secure hosting of community forums in a secure peer-to-peer data network, according to an example embodiment.

FIG. 10 illustrates example feature codes 102 that can be added to a conversation object 42 in operation 110 by the conversation factory. Each community object 42a and/or post object 42 can specify in the feature codes 102 a first community attribute 102a indicting whether the corresponding community/post is for an open community, a private community, or an unlisted community. A community object 42a also can comprise in its feature codes 102 features, attributes and policies that define permissible operations within the community created during processing of the community object. Each community object 42a can have a projection scope policy (integrated with the distribution policy 26 or distinct from the distribution policy 26 in the feature codes 102) that authorizes the community object 42a (and any modifications thereof by the owner of the community object 42a) to be sent by the endpoint device 12 used to create/modify the community object 42a to the directory server 28.

Another feature code 102b can specify posting privileges in terms of what type of federation entity has authority to post within a community 42a (or generate a reply 36a to a post 42b). Example posting privileges in the feature code 102b can include posting only by the owner of the community object 42a or post object 42b (i.e., no replies are permitted), posting only media content that is authoritatively authorized (e.g., approved by the content owner identified by federation ID in the message object 36, and/or approved by owner of the community object 42a or post object 42b), or having a permissible content rating. Example permissible content rating can include what kind of content can be added to the community object guidelines for content types, for example only PG13 or safer content (as rated by the MPIA).

The feature code 102b also can include posting privileges for only authorized members that are identified as selected trusted federation entities. The feature code 102b also can specify unlimited (open) posting without restriction.

Additional example feature codes 102c that can be set as machine learning features in a conversation object 42 include identifying whether open introductions are permitted. Each conversation object 42 can have a default feature of not permitting any open introductions ("no introductions"); a conversation object 42 also can have a feature set to "moderated introductions" or "open introductions". If an owner of a conversation object 42 sets the feature of permitting open introductions, then the joining by a federation user (e.g., "F3") 34 to a conversation object 42 representing a community object 42a (or post objects 42b) can cause a social connection agent in the endpoint device (e.g., "C") 12 to autonomously introduce the federation user "F3" 34 to other federations 34 identified in the participant list 50. Additional details regarding automatic introductions are described in commonly-assigned, copending application Ser. No. 17/378,312, filed Jul. 16, 2021, entitled "LOCALIZED MACHINE LEARNING OF USER BEHAVIORS IN NETWORK OPERATING SYSTEM FOR ENHANCED SECURE SERVICES IN SECURE DATA NETWORK", the disclosure of which is incorporated in its entirety herein by reference.

An additional feature code 102d can specify whether the community 42a or 42b is to enforce a secure voting, including parameters for implementing the secure voting (e.g., a secure voting, polling, or a survey allowing only a single up/down vote or a selection of one of multiple available choices, by a federation entity with no comments, etc.), or whether anyone can post.

Hence, example posts can include generating a secure voting, polling, or survey based on creating a post object 42b (i.e., a conversation object 42 of type "post" 122b), where the creating includes setting a feature code 102 in the post object 42b that no replies are allowed, setting a feature that provides two or more counters (i.e., "tallies"), including one counter for total number of votes cast, and a second counter for vote type. "Vote type" can vary depending on implementation: in one example, a "vote" type can be only a counted number of "Yes" votes (enabling determining a percentage of "Yes" votes cast relative to the number of votes cast); in another example, a vote type can include a counter number of "Yes" votes and a counted number of "No" votes; in another example, a single counter can track an aggregate "composite" count, for example as a positive or negative number (e.g., number of "Yes" votes minus number of "No" votes); in another example, a counter can identify an aggregate ranking value (e.g., average rating from possible rankings on a scale of "1" to "10"); in another example, a number of counters can be available for respective choices in the poll (e.g., five counters for selecting one or more choices from the available five options "A", "B", "C", "D", or "E", for example for identifying a most popular book choice or for an election of officers for an organization, etc.).

Hence, secure voting can be applied to conversation objects 42 and/or message objects 36. Each conversation object 42 and/or message object 36 that sets a feature for voting can include at least a first counter for total number of votes cast, and a second counter (e.g., a composite counter) that can specify a positive or negative number. A voting state machine executed within the community server 30 can update the conversation object 42 and/or the message object 36 in response to the vote being cast by the federation user 34 and sent securely to the community server 30.

Additional voting features that can be set in the feature codes 102 in the conversation object 42 and/or the message object 36 can require that a federation entity 34 has only one vote that is either: (1) fixed when cast; or (2) changeable until a prescribed deadline (that can be enforced by the lifecycle policy 24). Hence, an individual federation user 34 is encouraged to maintain secure possession of their endpoint device(s) 12 to ensure their individual vote is not compromised by another person gaining access to an endpoint device 12 owned by the federation user 34. Hence, the example embodiments can securely guarantee that a federation entity 34 can vote only once on any given object 42.

A particular feature of the example embodiments is that the identity management system 86 can ensure secure voting according to the voting features set in the conversation object 42 and/or the message object 36: the identity management 86 can provide absolute identity verification to ensure a two-way trusted relationship is established that ensures the identity of a federation user (e.g., "F1") 34 is known across all endpoint devices (e.g., "A", "A1") owned by a federation user 34; hence, a vote by a federation user (e.g., "F1") 34 on one owned endpoint device (e.g., "A") is federated across all the endpoint devices belonging to the same federation 34. Additional details regarding the identity management system are described in commonly-assigned, copending application Ser. No. 17/343,268, filed Jun. 9, 2021, entitled "IDENTITY MANAGEMENT SYSTEM ESTABLISHING TWO-WAY TRUSTED RELATIONSHIPS IN A SECURE PEER-TO-PEER DATA NETWORK", the disclosure of which is incorporated in its entirety herein by reference.

Further, as described previously each "in-flight" and "at-rest" data structure is cryptographically secure in the secure data network 5. The only access to any "in-flight" or "at-rest" data structure, or the only access to the secure data network 5, is via a prescribed API 80 of the network operating system 56 that provides exclusive access to the secure data network 5 and any "in-flight" or "at-rest" data structure. Hence, the example embodiments ensure enforcement of the secure voting according to the voting features across all the endpoint devices of the federation user 34.

Hence, the example embodiments can ensure that a vote can only be cast by a federation user (e.g., "F1" 34 having verified identity in the secure core network 10. In other words, executable "bots" are unable to access the secure data network 5 to cast false votes.

A conversation object 42 also can be tagged, for example with a star tag or a hash tag, described in detail in commonly-assigned, copending application Ser. No. 17/372,607, filed Jul. 12, 2021, entitled "DIRECTORY SERVER PROVIDING TAG ENFORCEMENT AND NETWORK ENTITY ATTRACTION IN A SECURE PEER-TO-PEER DATA NETWORK", the disclosure of which is incorporated in its entirety herein by reference.

A "post" is a conversation object 42*b* of type (or "kind") "post" 122*b* (also referred to as a "post object") that can reference a community object 42*a* by the corresponding conversation ID 44 of the community object 42*a*. Each post object 42*b* can have a projection scope policy in its distribution policy 26 (and/or feature codes 102) that authorizes the post object 42*b* (and any modifications thereof by the post object owner) to be sent to the directory server 28 by the endpoint device 12 used to create/modify the post object 42*b*. A post object 42*b* can be created in operation 110, for example, by the conversation factory in response to detecting a request (via the API 80) by the federation user 34 via its messenger application 72, where the conversation factory can add to the post object 42*b* associated features and policies that are consistent with the community object 42*a* referenced in the post object 42*b*. For example, a post object 42*b* may or may not allow replies, and also can include content rating restrictions as described above, voting, etc.

Hence, a post object 42*b* generated by the conversation factory is a first class object that can reference another first class object such as a community object 42*a*. In addition, the post object 42*b* can be created by a different federation user (e.g., "C") 34 than the community owner of the community object 42*a* (if permitted by the community object 42*a*). Hence, there is a "weak" reference in the post object 42*b* to the community object 42*a*, with no reference in the community object 42*a* to the post object 42*b* in order to enable posts to be added to a community without the necessity of updating the corresponding community object 42*a*.

Hence, a federation user 34 using an endpoint device 12 (owned by the federation user) can cause a conversation factory in the network operating system 56 to create in operation 110 a conversation object 42 with a type "community" 122*a* (i.e., a community object 42*a*) or "post" 122*b* (i.e., a post object 42*b*) with the appropriate features, policies, etc. specified in the feature codes 102. The conversation factory responds to creation of the conversation object 42 by registering with the directory server 28 attributes of the conversation object 42*a* or 42*b* (e.g., the conversation ID 44, title 130, image 132, federation ID 18 of the owner, etc.), enabling projection searches of the conversation object 42. The conversation factory also can register (via an online replication) the conversation object 42 to the community server 30 via the replicator device (e.g., "R1") 16 providing a connection for the endpoint device 12 to the secure data network 5.

Hence, a conversation object 42 representing a community object 42*a* (or post objects 42*b*) of an open community or a private community can be hosted on the community server 30: any changes of a community object 42*a* (or post object 42*b*) by its federation owner (via an owned endpoint device) is autonomically updated by the conversation factory in operations 110, 112, 114, 116, and 118 to the community server 30, and any deletion of the community object 42 (or post object 42*b*) by its federation owner is deleted in operations 110, 112, 114, 116, and 118 by the community server; the community server 30 can respond to any deletion of a conversation object 42 representing a community object 42*a* (or post objects 42*b*) by notifying in operation 118 the directory server 28 for updating of its indexes. The updating of its indexes by the directory server 28 in operation 120 enables the registered community to be searchable by federation entities using a projection search, described in detail in the above-incorporated copending application Ser. No. 17/372,607.

The directory server 28 in operation 120 can stitch together a join table that enables the directory server 28 to identify post objects 42*b* that reference a community object 42*a*. In particular, the posting of a post object 42*b* by a federation user to an identified community (where the conversation ID 44 of the community object 42*a* is referenced in the post object 42*b*) can cause the directory server 28 to store in RAM memory a hash between the community object 42*a* and all the post objects 42*b* that reference the community object.

Executable agents in the network operating system 56 (executed in the network device executing the directory server 28) also can respond to detected feature codes 102 in a conversation object 42 to facilitate intelligent behaviors in the secure data network 5. For example, one feature code can map a feature to a sound, enabling for example the directory server 28 to execute a search based on sound (i.e., phonetically "sounds like") using sound indexes.

Hence, the directory server 28 can generate and store in its RAM (or Least Recently Used (LRU) cache) an index of all post objects 42*b* that reference the community object 42*a*.

Figure 9B:
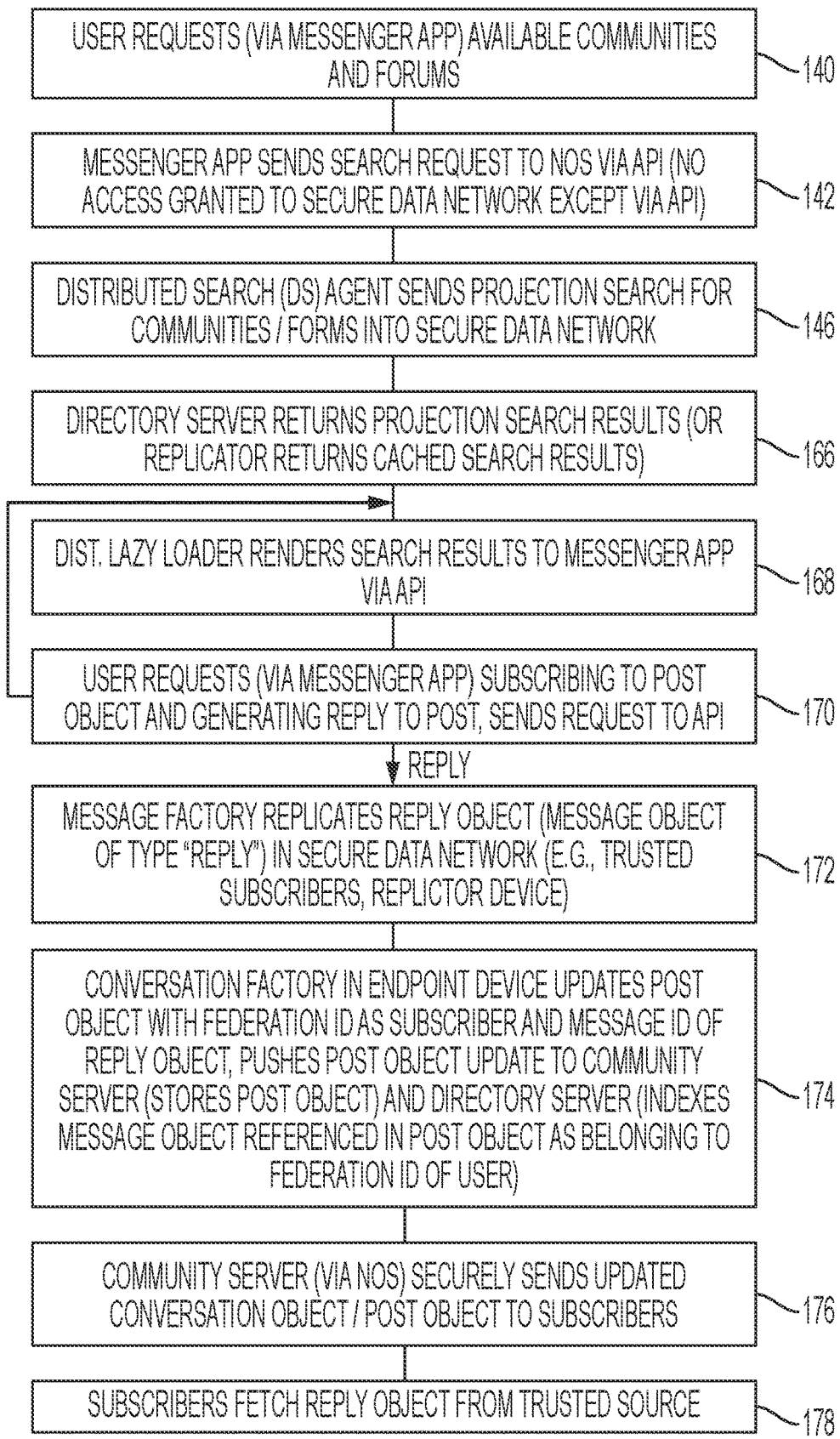

As illustrated in FIG. 9B, the updating of indexes by the directory server 28 enables a network operating system 56 to execute projection searches for communities 42*a* and posts 42*b* hosted by one or more community servers 30 in the secure data network 5. A federation user (e.g., "F1") 34 of an endpoint device (e.g., "A") 12 in operation 140 can find the post objects 42b belonging to a community object 42a by generating (within the messenger application 72) a search request (specifying a selected sort order, e.g., the first ten (10) trending posts) that is sent to the network operating system 56 via the prescribed API 80 in operation 142. As described previously, the network operating system 56 prevents any executable resource from accessing the secure data network 5, or an "in-flight" or "at-rest" data structure associated with the secure data network 5, without authorized access via the prescribed API 80.

The search request generated and output by the messenger application 72 (via the prescribed API 80) causes the DS agent 82 in the network operating system 56 in operation 146 to execute a projection search into the secure private core network 10. If the associated replicator device "R1" 16 has no cached search results responsive to the projection search, the replicator device "R1" 16 can forward the projection search to the directory server 28.

The directory server 28 in operation 166 can retrieve its index of a list of communities (by conversation object ID 44) 42a and a list of the post objects 42b (by conversation object ID 44) that reference the communities 42a (e.g., from an LRU cache), and supply the index for delivery to the endpoint device (e.g., "A") 12 via the replicator device "R1" 16 via a secure data packet. The replicator device "R1" 16 can cache the index as cached projection search results, and securely forward the index to the requesting network device "A" 12 within a secure data packet.

The secure network services 76 in the network operating system 56 can validate the secure data packet, decrypt the secure data packet for recovery of the index responsive to the projection search, and cause a distributed lazy loader agent in operation 168 to securely retrieve the community objects 42a, post objects 42b, and/or reply objects 36a (identified in the index by their respective identifiers 44 or 38) that are responsive to the projection search. The secure retrieval by the distributed lazy loader agent may be based on a "whisper" protocol where the distributed lazy loader can locate the necessary data objects 42a, 42b, and/or 36a from the nearest trusted network device (e.g., replicator device "R1" 16 or two-way trusted network device "B" 12), minimizing the necessity of retrieving the necessary data objects 42a and 42b from the community server 30 in the secure private core network 10.

The distributed lazy loader in operation 168 also can execute "auto-hiding" or "auto-outcasting" based on machine learning-based features specified in the feature codes 102 of the retrieved conversation objects 42a and/or 42b. In particular, the distributed lazy loader in operation 168 can autonomically hide any content (e.g., within the hypercontent 134 or image 132 of a post object 42b or a reply object 36a) that a conversation owner or the federation user "F1" 34 of the endpoint device "A" executing the projection search considers inappropriate, offensive, etc. Hence, the distributed lazy loader in operation 168 can execute autonomic outcasting of a message object (by its message object ID 38) or autonomic outcasting of a user that posted the offending message object (by federation ID 18).

Hence, network operating system 56 can "protect" a federation user (e.g., "F1") 34 viewing a conversation based on locally outcasting a message object (by its message object ID 18) and/or another federation user (e.g., "F3" by their federation ID) to prevent any further viewing of the message object ID, regardless of its location in any conversation in the secure data network, and/or to prevent any further communications with the other federation user (e.g., "F3") either within the conversation, within any conversation, or in any communications due to revoking any two-way trusted relationship with the outcasted federation user. A message object 36 and/or a federation user 34 also can be reported that identifies a specific violation, along with a certification by the reporting federation user 34 verifying the authenticity of the reporting event. The outcasting can be set to be executed autonomically by the network operating system 56, or upon verification by the federation user 32.

A post object 42b also can have a feature code 102 that sets the post object 42b as a "sticky" that causes the post object 42 to be rendered at the top of a community listing of posts.

Hence, the distributed lazy loader in operation 168 can dynamically render a display of the search results, via the API 80, to the messenger application 72 in operation 168.

The rendering by the distributed lazy loader of the community objects 42a, post objects 42b and/or reply objects 36a as illustrated in FIG. 7 enables the messenger application 72 to instantly display the selected community with a presentation of a menu of options based on the features and policies (e.g., option to post in an open community; requiring the federation user to join if the community is not an open community but is a private community, etc.). If the selected community is an open community according to the features and policies specified in the features, then the selection of the community by the federation user 34 from the list of displayed communities in operation 170 enables the federation user 34 to join the corresponding open community, for example based on the messenger application 72 sending in operation 170.

The distributed layer loader can respond to the federation user 34 joining the open community (via the API 80) by presenting a list of "posts" 42b for the community to the messenger application 72 via the API 80. The messenger application 72 in operation 170 can instantly display the list of the first ten (10) trending post objects 42b for the selected community object 42a, based on ordering the list of the first ten (10) trending post objects 42b from the index generated by the directory server 28.

In response to a federation user 34 selecting one of the displayed communities (causing the messenger application 72 to send via the API 80 a request for a selected community), the distributed lazy loader in operation 168 can obtain the community object 42a from a two-way trusted device (e.g., the replicator device 16) based on the corresponding conversation ID 44, and cause (via the API 80) the messenger application 72 to render in operation 170 the community object 42a to the user via the user display.

As described previously, a federation entity (e.g., "F2") 34 creating a post object 42b can set a policy to either accept replies or not accept replies. Hence, the federation entity (e.g., "F1") in operation 170 can cause the messenger application 72 to generate a request (via the API 80) for generation of a reply object 36a. The reply object 36a can be generated by the conversation factory of the network operating system 56 as a reply to a post object 42a, or a prior reply object 36a, illustrated in FIG. 7. As illustrated in FIG. 7, the posting of a post object 42b referencing a community object 42, and the posting of a reply object 36a that is referenced in the message list 48 of reply objects 36a, enables an aggregation of post objects 42b and reply objects 36a within each community object 42a, for example as a multi-layered comment thread (replies to replies, etc.) for each post object 42a.

Hence, a message factory in the secure network services 76 of the network operating system 56 of the endpoint device 12 executing the messenger application 72 can generate the reply object 36a as a message object (illustrated in FIG. 2), and replicate in operation 172 the reply object 36a, as appropriate, into the secure data network 5 (e.g., to a replicator device "R1") 16.

The conversation factory in the network operating system 56 of the endpoint device 12 in operation 174 can update the post object 42b that is the target of the reply object 36a with the message ID 38 of the reply object 36a in the message field 48 of the post object 42b, and the federation ID (e.g., "F1") 18 of the federation entity into the subscriber list 50.

The conversation factory in the network operating system 56 of the endpoint device 12 in operation 174 also can securely "push" the updated post object 42b to the community server 30 (via the replicator device "R1" 16), causing the community server 30 (following validation by its underlying network operating system 56) to store the updated post object 42b.

The conversation factory in the network operating system 56 of the endpoint device 12 in operation 174 also can securely "push" the updated post object 42b to the directory server 28 (via the replicator device "R1" 16), causing the directory server 28 (following validation by its underlying network operating system 56) to update its indexes to indicate the reply object 36a referenced in the updated post object 42b is owned by the federation ID "F1" 18 of the user "F1".

An endpoint device 12 of a federation user 34 can follow a conversation object 42a and/or a post object 42b based on the corresponding network operating system 56 of the endpoint device 12 subscribing to the conversation object 42a and/or the post object 42b (causing the federation ID of the federation user to be added to the subscriber list 50 of the conversation object 42a and/or the post object 42b). Each community object 42a and/or a post object 42b can have a corresponding subscriber list 50 of "followers" of federation entities 32 (i.e., "following federation entities"), where a following federation entity 32 can subscribe to a conversation object (e.g., community and/or post object) 42 via the messenger application 72 executed on the respective endpoint devices 12 of the following federation entities 32.

Hence, any change in a conversation object (e.g., community and/or post object) 42 is autonomically "pushed" by the community server 30 to an endpoint device 12 of each following federation entity 32, enabling each following federation entity 32 to receive "live updates" of the conversation object 42. Hence, an endpoint device 12 following a post object 42b can be notified of an update to the post object 42b by the community server in operation 176 (via its underlying network operating system 56).

Hence, the community server 30 in operation 176 can send the updated post object 174 to subscribers listed in the subscriber list 50, enabling the respective distributed lazy loaders in the network operating systems 56 to fetch the reply object 36a specified in the updated post object, for example from a two-way trusted replicator device 16.

If a federation user is not following a post object 42b, then the federation user 32 can learn of the change during the next "fetch" (projection search) for the post object 42b to the directory server 28 in operation 178. In particular, the federation entity 32 can obtain the updates based on causing the messenger application 72 to execute a "refresh" (via a prescribed API 80) of a conversation object 42 (e.g., based on executing a refresh operation on a display of the conversation object in the messenger application 72) to the directory server for updated search results related to the conversation object 42. Hence, the messenger application 72 of a federation user can provide a rendering of a conversation that resembles a "live" web page that is providing "live" updates as post objects 42b are added to the conversation or modified.

The referencing of a post object 42b to a community object 42a, and reply objects 36 as message objects referenced in a post object 42b, enables a post object owner to move the post object 42a (and all reply objects "anchored" by the post object 42a) to a different community object 42a in operation 180 of FIG. 7. In particular, a federation user 34 can cause the messenger application 72 to move a post object (e.g., "P1") 42b from a first community object (e.g., "COM1") 42a to a second community object (e.g., "COM2") 42a merely by causing the messenger application 72 to access an API 80 that changes the referenced community object 42a in the post object (e.g., "P1") 42b from the conversation ID 44 of the first community object (e.g., "COM1") 42a to the conversation ID 44 of the second community object (e.g., "COM2") 42a, with no change to the community object 42a. The update of the post object 42b by the conversation factory in the network operating system 56 causes the endpoint device 12 implementing the update of the post object 42 to autonomically register the update with the directory server 28, causing the directory server 28 to update its hash and caches of the hash. The conversation factory also updates (via its replicator device) the community server 30 with the updated post object 42b that references the second community object "COM2" 42a.

Reply objects 36a are stored securely in a distributed manner in the secure data network 5. Generation of a reply object 36a requires a federation user 34 to join the post object 42b as a subscriber, causing the federation user 34 to be identified (by its federation ID 18) in the subscriber list 50 of the post object; a federation user 34 having joined a post object 42b can obtain a distributed copy of the post object 42b and the messages 36a referenced in the post object 42b. The reply object 36a is added to the message list 48 of the post object 42a.

If an endpoint device 12 is ever disconnected from the secure core network 10, the autonomic synchronizer 52 in the network operating system 56 of the endpoint device 12 can autonomically synchronize 52 all data objects in a secure manner, including updating any stored conversation objects 42a and/or post objects 42b, and retrieving any new post objects 42 for any followed conversations or any pending projection search requests.

In particular, the autonomic synchronizer 52 can respond to the transition to the online state of the endpoint device "A" 12 by autonomically synchronizing all secure data structures that have been modified while "offline", based on synchronizing journal entries in the network operating system 56 that identify hypercontent changes in each modified data object in the network operating system 56. The autonomic synchronizer 52 can execute the autonomic synchronization with the appropriate peer endpoint devices, depending on the data structure being modified (e.g., update conversation participants of changes to a conversation object 42 or message object 36, update federation devices), etc., including synchronizing data objects 22, 36, and 42 between endpoint devices (e.g., "A" and "A1") 12 belonging to the same federation (e.g., "F1") 34. The autonomic synchronizer 152 can execute gossip protocols to reach the closest network device having the most recent version of a secure data object, enabling the autonomic synchronizer 52 in the endpoint device "A" to move toward "truth" (i.e., the most recent version available) based on the relative connection availability of all the endpoint devices storing the associated secure data object.

Note that the distributed execution of communities based on conversation objects 42 also enables neighboring endpoint devices 12 that are disconnected from the secure private core network 10 to maintain a local community forum based on the neighboring endpoint devices forming an isolated peer-to-peer network, and the neighboring endpoint devices 12 executing a local instance of an MCP device 14 and the community server 30 within the isolated peer-to-peer network.

According to example embodiments, a network operating system provides exclusive and authoritative control for accessing the secure data network and any at-rest or in-flight secure data structure. The network operating system enables secure hosting of community forums by one or more community servers overlying the network operating system, for distributed community forum management in the secure data network.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a secure executable container executed by a network device, a request initiated by a user for a community forum in a secure data network, the user having generated the request via an endpoint device and the user having established a two-way trusted relationship with the endpoint device in the secure data network;
processing, by the secure executable container, the request for the community forum in the secure data network, the processing including causing a network device executing a community server to post the community forum in the secure data network according to identifiable features selected by the user; and
preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container; wherein:
the network device receiving the request is the network device executing the community server;
the receiving includes the secure executable container receiving the request as an encrypted data packet from a replicator device having a corresponding two-way trusted relationship with the endpoint device and a corresponding two-way trusted relationship with the network device executing the community server;
the processing including the secure executable container recovering the request from the encrypted data packet based on a secure private key owned by the network device executing the community server, the request implemented as a data structure identified by the secure executable container as a conversation object having a first prescribed type and that uniquely identifies the conversation object as a community object;
the method further comprising receiving, by the secure executable container, a second encrypted data packet via the secure data network;
the processing including recovering from the second encrypted data packet a second conversation object having a second prescribed type and that uniquely identifies the second conversation object as a post object associated with the conversation object, and sending the second conversation object to the community server via the prescribed API;
the method further comprising the community server posting the post object in the community forum based on causing the secure executable container, via the prescribed API, to send the post object to a subscriber identified in the conversation object.

2. The method of claim 1, wherein:
the network device receiving the request is the endpoint device;
the receiving includes the secure executable container receiving the request via the prescribed API from an executable application configured for generating the request and executed within the network device;
the processing including the secure executable container generating a conversation object as a data structure of a first prescribed type and that uniquely identifies the community forum, the generating of the conversation object including:
creating a conversation identifier that includes a federation identifier and a corresponding universally unique identifier, the federation identifier identifying the user in the secure data network and generated by the secure executable container during registration of the user in the secure data network, and
adding to the conversation object the identifiable features selected by the user in the request.

3. The method of claim 2, wherein the request is for generation of the community forum, and wherein adding the identifiable features by the secure executable container includes one or more of:
setting the community forum to one of an open community discoverable in the secure data network and available to any trusted federation entity in the secure data network, a private community discoverable in the secure data network and available to selected trusted federation entities having received approval from the user, or an unlisted community not discoverable in the secure data network and requiring a private invitation from the user;
setting posting privileges in the community forum to at least one of posting only by the user, posting only media content having authoritative authorization or a prescribed permissible content rating, posting only by the selected trusted federation entities, or unlimiting posting;
setting an introduction policy for introducing subscribers to one of no autonomic introductions between the subscribers to the community forum, moderated autonomic introductions between the subscribers, or open autonomic introductions between the subscribers.

4. The method of claim 2, wherein the adding the identifiable features includes setting a secure voting in the community forum.

5. The method of claim 2, wherein the causing further including the secure executable container sending a registration of the conversation object to a directory server in the secure data network, the registration enabling the directory server to identify the conversation object associated with the community forum.

6. The method of claim 5, wherein the request is for generation of the conversation object as a post object within the community forum, the causing further comprising:
generating the post object with a reference to the community forum;
sending the post object to the community server via the secure data network;
the registration enabling the directory server to identify the post object referencing the community forum.

7. The method of claim 2, further comprising:
receiving, by the secure executable container via the API, a second request for generation of a reply object to a post object that references the community forum, the causing further comprising:
generating the reply object as a message object having a message identifier comprising the federation identifier and a corresponding universally unique identifier;
registering, with the community server, the federation identifier as a subscriber of the reply object and the message identifier within a message list of the post object.

8. The method of claim 2, wherein:
the network device executing the community server is the endpoint device;
the causing including the secure executable container sending the conversation object to the community server executed in the endpoint device for posting the community forum in the secure data network.

9. The method of claim 1, wherein:
the processing further includes sending the conversation object to the community server via the prescribed API;
the method further comprising the community server posting the community forum based on causing the secure executable container, via the prescribed API, to send the conversation object to a requesting network device via the secure data network.

10. The method of claim 1, wherein the processing includes sending a registration of the second conversation object to a directory server that causes the directory server to create an index that identifies the second conversation object referencing the conversation object.

11. The method of claim 1, wherein:
the processing further includes sending the conversation object to the community server via the prescribed API;
the method further comprising the community server posting the community forum based on sending the conversation object, via the prescribed API, to following federation entities of the secure data network that are identified as subscribers in the conversation object.

12. The method of claim 11, further comprising:
receiving, by the community server via the prescribed API, a post object having been decrypted by the secure executable container;
determining, by the community server, that the post object references the conversation object; and
updating, by the community server via the prescribed API, the community forum based on causing the secure executable container to send the post object to the following federation entities.

13. The method of claim 12, further comprising:
detecting, by the community server, second following federation entities of the secure data network that are identified as corresponding subscribers of the post object; and
updating, by the community server via the prescribed API, the post object based on notifying the second following federation entities of any change to the post object, including addition of a message identifier as a reply to the post object.

14. One or more non-transitory tangible media encoded with logic for execution by a machine and when executed by the machine operable for:
receiving, by a secure executable container executed by the machine implemented as a network device, a request initiated by a user for a community forum in a secure data network, the user having generated the request via an endpoint device and the user having established a two-way trusted relationship with the endpoint device in the secure data network;
processing, by the secure executable container, the request for the community forum in the secure data network, the processing including causing a network device executing a community server to post the community forum in the secure data network according to identifiable features selected by the user; and
preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container; wherein:
the network device receiving the request is the network device executing the community server;
the receiving includes the secure executable container receiving the request as an encrypted data packet from a replicator device having a corresponding two-way trusted relationship with the endpoint device and a corresponding two-way trusted relationship with the network device executing the community server;
the processing including the secure executable container recovering the request from the encrypted data packet based on a secure private key owned by the network device executing the community server, the request implemented as a data structure identified by the secure executable container as a conversation object having a first prescribed type and that uniquely identifies the conversation object as a community object;
the one or more non-transitory tangible media further operable for receiving, by the secure executable container, a second encrypted data packet via the secure data network;
the processing including recovering from the second encrypted data packet a second conversation object having a second prescribed type and that uniquely identifies the second conversation object as a post object associated with the conversation object, and sending the second conversation object to the community server via the prescribed API;
the one or more non-transitory tangible media further operable for the community server posting the post object in the community forum based on causing the secure executable container, via the prescribed API, to send the post object to a subscriber identified in the conversation object.

15. The one or more non-transitory tangible media of claim 14, wherein:
the network device receiving the request is the endpoint device;

the receiving includes the secure executable container receiving the request via the prescribed API from an executable application configured for generating the request and executed within the network device;

the processing including the secure executable container generating a conversation object as a data structure of a first prescribed type and that uniquely identifies the community forum, the generating of the conversation object including:

creating a conversation identifier that includes a federation identifier and a corresponding universally unique identifier, the federation identifier identifying the user in the secure data network and generated by the secure executable container during registration of the user in the secure data network, and adding to the conversation object the identifiable features selected by the user in the request.

16. The one or more non-transitory tangible media of claim 15, wherein the causing further includes the secure executable container sending a registration of the conversation object to a directory server in the secure data network, the registration enabling the directory server to identify the conversation object associated with the community forum.

17. An apparatus implemented as a physical machine, the apparatus comprising:

non-transitory machine readable media configured for storing executable machine readable code;

a device interface circuit; and a processor circuit configured for executing the machine readable code, and when executing the machine readable code operable for:

receiving, by a secure executable container executed by the apparatus implemented as a network device, a request initiated by a user for a community forum in a secure data network, the user having generated the request via an endpoint device and the user having established a two-way trusted relationship with the endpoint device in the secure data network, processing, by the secure executable container, the request for the community forum in the secure data network, the processing including causing a network device executing a community server to post the community forum in the secure data network according to identifiable features selected by the user, and preventing, by the secure executable container, any executable resource in the network device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container: wherein:

the network device receiving the request is the network device executing the community server;

the receiving includes the secure executable container receiving the request as an encrypted data packet from a replicator device having a corresponding two-way trusted relationship with the endpoint device and a corresponding two-way trusted relationship with the network device executing the community server;

the processing including the secure executable container recovering the request from the encrypted data packet based on a secure private key owned by the network device executing the community server, the request implemented as a data structure identified by the secure executable container as a conversation object having a first prescribed type and that uniquely identifies the conversation object as a community object;

the processor circuit further operable for receiving, by the secure executable container, a second encrypted data packet via the secure data network;

the processing including recovering from the second encrypted data packet a second conversation object having a second prescribed type and that uniquely identifies the second conversation object as a post object associated with the conversation object, and sending the second conversation object to the community server via the prescribed API;

the processor circuit further operable for the community server posting the post object in the community forum based on causing the secure executable container, via the prescribed API, to send the post object to a subscriber identified in the conversation object.

18. The apparatus of claim 17, wherein the processing includes sending a registration of the second conversation object to a directory server that causes the directory server to create an index that identifies the second conversation object referencing the conversation object.

19. The apparatus of claim 17, wherein:

the processing further includes sending the conversation object to the community server via the prescribed API;

the processor circuit further operable for causing the community server to post the community forum based on sending the conversation object, via the prescribed API, to following federation entities of the secure data network that are identified as subscribers in the conversation object.

20. The one or more non-transitory tangible medium of claim 14, wherein the processing includes sending a registration of the second conversation object to a directory server that causes the directory server to create an index that identifies the second conversation object referencing the conversation object.

* * * * *